(12) United States Patent
Watanabe

(10) Patent No.: US 12,536,777 B2
(45) Date of Patent: Jan. 27, 2026

(54) INFORMATION PROCESSING DEVICE, INFORMATION PROCESSING METHOD, AND RECORDING MEDIUM

(71) Applicant: NEC Corporation, Tokyo (JP)

(72) Inventor: Yoshikazu Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 398 days.

(21) Appl. No.: 18/271,434

(22) PCT Filed: Jan. 14, 2021

(86) PCT No.: PCT/JP2021/001028
§ 371 (c)(1),
(2) Date: Jul. 7, 2023

(87) PCT Pub. No.: WO2022/153432
PCT Pub. Date: Jul. 21, 2022

(65) Prior Publication Data
US 2024/0087296 A1    Mar. 14, 2024

(51) Int. Cl.
*G06V 10/774* (2022.01)
*G06V 10/22* (2022.01)
*G06V 10/70* (2022.01)

(52) U.S. Cl.
CPC ............ *G06V 10/774* (2022.01); *G06V 10/22* (2022.01); *G06V 10/87* (2022.01); *G06V 2201/07* (2022.01)

(58) Field of Classification Search
CPC ........ G06V 20/58; G06V 10/44; G06V 10/96; G06V 10/26; G06V 2201/07; G06V 10/87;
(Continued)

(56) References Cited

U.S. PATENT DOCUMENTS

2019/0294927 A1* 9/2019 Guttmann ............... G06F 18/29
2019/0332952 A1* 10/2019 Nonaka .................... G06N 3/08
2022/0405620 A1* 12/2022 Neo ........................ G06V 20/52

FOREIGN PATENT DOCUMENTS

JP    2018-124639 A    8/2018
JP    2020-017136 A    1/2020
(Continued)

OTHER PUBLICATIONS

WO-2021085258-A1: English Translation (Year: 2021).*
(Continued)

*Primary Examiner* — Sumati Lefkowitz
*Assistant Examiner* — Aaron Joseph Sorrin
(74) *Attorney, Agent, or Firm* — Sughrue Mion, PLLC

(57) ABSTRACT

An information processing device according to the present invention includes: a memory; and at least one processor coupled to the memory. The processor performs operations. The operations include: generating, based on inference target data include a detection target object, aggregate data smaller than the inference target data; and applying the aggregate data to a trained model to infer a first region that is a region of the detection target object in the aggregate data, generating packed data that is data packed with the first region or a region of the inference target data, applying the packed data to a trained model to infer a second region that is a region of the detection target object that is included, and inferring the detection target object in the inference target data based on the second region.

18 Claims, 13 Drawing Sheets

(58) Field of Classification Search
CPC ...... G06V 10/25; G06V 10/774; G06V 10/22; G06N 20/00; G06N 3/08; G06F 18/214; G06T 7/00
See application file for complete search history.

(56) References Cited

FOREIGN PATENT DOCUMENTS

| | | | |
|---|---|---|---|
| WO | 2019/022136 A1 | 1/2019 | |
| WO | WO-2021085258 A1 * | 5/2021 | ............. G06N 20/00 |

OTHER PUBLICATIONS

International Search Report for PCT Application No. PCT/JP2021/001028, mailed on Mar. 16, 2021.
English translation of Written opinion for PCT Application No. PCT/JP2021/001028, mailed on Mar. 16, 2021.
Shaoqing Ren, Kaiming He, Ross Girshick, Jian Sun, "Faster R-CNN: Towards Real-Time Object Detection with Region Proposal Networks", [online], Jan. 6, 2016, Cornel University, [Searched on Oct. 16, 2019], the Internet <URL:https://arxiv.org/abs/1506.01497>.
Wei Liu, Dragomir Anguelov, Dumitru Erhan, Christian Szegedy, Scott Reed, Cheng-Yang Fu, Alexander C. Berg, "SSD: Single Shot MultiBox Detector", [online], Dec. 29, 2016, Cornel University, [Searched on Oct. 16, 2019], the Internet, <URL:https://arxiv.org/abs/1512.02325>.
Tsung-Yi Lin, Priya Goyal, Ross Girshick, Kaiming He, Piotr Dollar, "Focal Loss for Dense Object Detection", [online], Feb. 2, 2018, Cornel University, [Searched on Oct. 16, 2019], the Internet, <URL:https//arxiv.org/abs/1708.02002>.

* cited by examiner

INFORMATION PROCESSING DEVICE, INFORMATION PROCESSING METHOD, AND RECORDING MEDIUM

This application is a National Stage Entry of PCT/JP2021/001028 filed on Jan. 14, 2021, the contents of all of which are incorporated herein by G8110 reference, in their entirety.

TECHNICAL FIELD

The present invention relates to information processing, and particularly to inference and learning in machine learning.

BACKGROUND ART

As one of main tasks using machine learning, there is an object detection task in an image.

The object detection task is a task of generating a list of sets of the position and the class of the detection target object that presents in an image (see, for example, PTL 1). As the position, coordinates (also referred to as a bounding box (BB)) of four vertices of a rectangular region including the detection target object are often used.

An object detection and recognition device (hereinafter, referred to as a "related device") described in PTL 1 is an invention intended to improve the accuracy of detection and recognition of a small object.

Specifically, when acquiring an image for which an object is to be detected, the related device separates the foreground in the image. Then, the related device extracts a region having a predetermined size or less in the foreground as the object candidate region. Further, the related device extracts an image of a region around the extracted object candidate region.

Then, the related device inputs the image of the object candidate region and the image of the surrounding region to a trained convolutional neural network (CNN), and infers the position and the category of the object in each image. Then, the related device generates a category obtained by integrating the plurality of inferred categories. Then, the related device stores the detection result of the object and the integrated category.

In this manner, the related device increases the number of images used for inference to improve the accuracy of object detection and recognition.

In recent years, among machine learning, an object detection task using deep learning has been widely used (see, for example, NPLs 1 to 3).

In NPLs 1 to 3, an object detection task is given a learning image group and information about a detection target object in each image as correct answer data for machine learning.

The information about the detection target object is selected according to the specification of the object detection task. For example, the information about the detection target object includes BB including the detection target object and a class of the detection target object. In the following description, the BB and the class will be used as an example of the information on the detection target object.

Then, in NPLs 1 to 3, the object detection task generates a trained model as a result of machine learning using deep learning using a learning image group for and information about a detection target object.

Then, the object detection task applies the image including the detection target object to the trained model to infer the detection target object in the image. Then, the object detection task outputs the BB and the class for each of detection target objects included in the image. The object detection task may output an evaluation result (for example, confidence) of the inference result in addition to the BB and the class.

For example, a person and vehicle monitoring system can be constructed by inputting an image from a monitoring camera to an object detection task and using positions and classes of a person and a vehicle appearing in the image of the monitoring camera inferred by the object detection task.

CITATION LIST

Patent Literature

PTL 1: JP 2020-017136 A

Non Patent Literature

NPL 1: Shaoqing Ren, Kaiming He, Ross Girshick, Jian Sun, "Faster R-CNN: Towards Real-Time Object Detection with Region Proposal Networks", [online], 6 Jan. 2016, Cornel University, [Searched on Oct. 16, 2019], the Internet <URL:https://arxiv.org/abs/1506.01497>

NPL 2: Wei Liu, Dragomir Anguelov, Dumitru Erhan, Christian Szegedy, Scott Reed, Cheng-Yang Fu, Alexander C. Berg, "SSD: Single ShotMultiBox Detector", [online], 29 Dec. 2016, Cornel University, [Searched on Oct. 16, 2019], the Internet, <URL:https://arxiv.org/abs/1512.02325>

NPL 3: Tsung-Yi Lin, Priya Goyal, Ross Girshick, Kaiming He, Piotr Dollar, "Focal Loss for Dense Object Detection", [online], 2 Feb. 2018, Cornel University, [Searched on Oct. 16, 2019], the Internet, <URL:https//arxiv.org/abs/1708.02002>

SUMMARY OF INVENTION

Technical Problem

In general, machine learning inference processing is a process that takes a long time with a high calculation load. Specifically, the object detection task has a high calculation load among machine learning, and requires a long time for processing.

However, the object detection task may be required to obtain a result of inference in a short time. For example, in a case where an emergency occurs, a monitoring system including a monitoring camera is required to complete detection of an object in an image from the monitoring camera without delay (for example, several tens ms to several seconds).

The related device described in PTL 1 is an invention that increases the number of images to be processed to improve the accuracy of detection and recognition of small objects. That is, the related device is an invention of increasing images to be inferred. Therefore, when the related device is used, the inference processing time is long. As described above, the technique described in PTL 1 cannot solve the above issue of shortening the inference processing time.

NPLs 1 to 3 do not disclose a technique for shortening the processing time.

That is, PTL 1 and NPLs 1 to 3 have an issue that the inference time in the object detection task cannot be shortened.

An object of the present invention is to provide an information processing device and the like that solve the above issue and shorten a time for inferring a detection target object.

Solution to Problem

An information processing device according to an aspect of the present invention includes:
 a memory; and
 at least one processor coupled to the memory
The processor performs operations. The operations include:
 generating, based on inference target data that is a plurality of pieces of data at least some of which include a detection target object, aggregate data the number of pieces of which is smaller than the number of pieces of data included in the inference target data; and
 applying the aggregate data to a trained model to infer, as a primary inference, a first region that is a region of the detection target object in the aggregate data, generating packed data that is data packed with a duplicate of the first region or a duplicate of a region of the inference target data related to the first region, applying the packed data to a trained model to infer, as a secondary inference, a second region that is a region of the detection target object that is included in the packed data, and inferring the detection target object in the inference target data based on the second region.

An information processing system according to an aspect of the present invention includes:
 the above information processing device;
 an input device that outputs inference target data to the information processing device; and
 a display device that acquires and displays a result of inference by the information processing device.

An information processing method according to an aspect of the present invention includes:
 generating, based on inference target data that is a plurality of pieces of data at least some of which include a detection target object, aggregate data the number of pieces of which is smaller than the number of pieces of data included in the inference target data; and
 applying the aggregate data to a trained model to infer, as a primary inference, a first region that is a region of the detection target object in the aggregate data, generating packed data that is data packed with a duplicate of the first region or a duplicate of a region of the inference target data related to the first region, applying the packed data to a trained model to infer, as a secondary inference, a second region that is a region of the detection target object that is included in the packed data, and inferring the detection target object in the inference target data based on the second region.

An information processing method according to an aspect of the present invention includes:
 performing, by an information processing device, the above information processing method;
 outputting, by an input device, inference target data to the information processing device; and
 acquiring and displaying, by the display device, a result of inference by the information processing device.

A non-transitory computer-readable recording medium according to an aspect of the present invention embodies a program for causing a computer to perform a method. The method includes:
 generating, based on inference target data that is a plurality of pieces of data at least some of which include a detection target object, aggregate data the number of pieces of which is smaller than the number of pieces of data included in the inference target data; and
 applying the aggregate data to a trained model to infer, as a primary inference, a first region that is a region of the detection target object in the aggregate data, generating packed data that is data packed with a duplicate of the first region or a duplicate of a region of the inference target data related to the first region, applying the packed data to a trained model to infer, as a secondary inference, a second region that is a region of the detection target object that is included in the packed data, and inferring the detection target object in the inference target data based on the second region.

Advantageous Effects of Invention

According to the present invention, it is possible to achieve an effect of shortening the time for inferring the detection target object.

EXAMPLE EMBODIMENT

Figure 1:
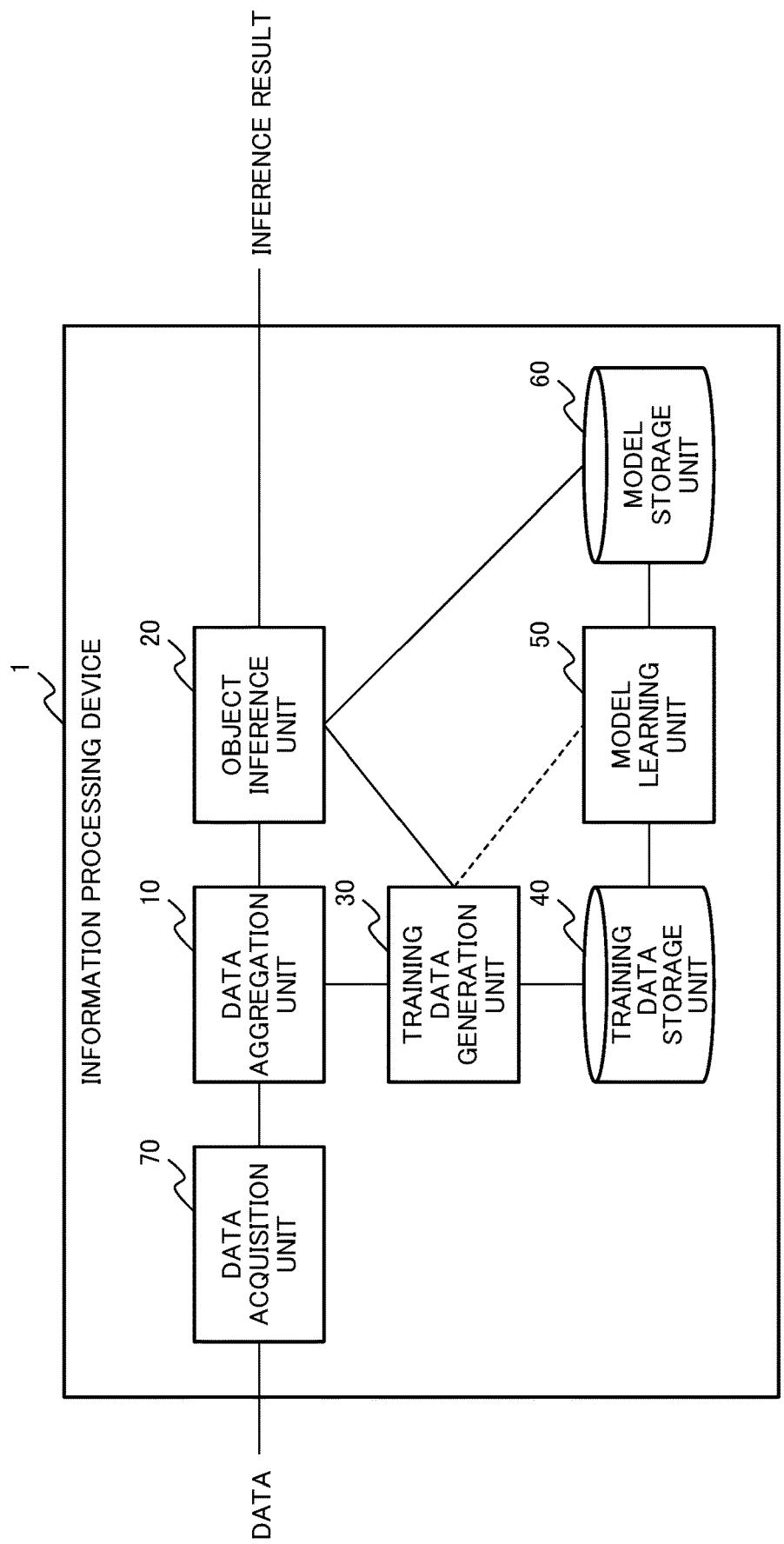
FIG. 1 is a block diagram illustrating an example of a configuration of an information processing device according to a first example embodiment.

Hereinafter, an example embodiment of the present invention will be described with reference to the drawings.

Each drawing is for describing an example embodiment. However, each example embodiment is not limited to the description of the drawings. Similar configurations in the respective drawings are denoted by the same reference numerals, and repeated description thereof may be omitted.

In the drawings used in the following description, in the description of each example embodiment, the description of portions not related to the solution of the problem of the present invention may be omitted and not illustrated.

In the following description, each example embodiment uses an image (still image or moving image) captured by a camera or the like as an example of data to be processed. In the following description, each example embodiment uses an object detection task of inferring a detection target object in an image as an example of an operation. In the following description, each example embodiment uses BB, a class, and confidence, which are results of inference of the object detection task, as an example of a result of inference in a case of using an image.

However, each example embodiment may use data different from the image as data to be processed. For example, each example embodiment may use depth data acquired using a depth sensor. Alternatively, each example embodiment may use three-dimensional data acquired using light detection and ranging (LIDAR).

The operation in each example embodiment is not limited to the object detection task. Furthermore, the result of inference in each example embodiment is not limited to BB, class, and confidence.

First Example Embodiment

Hereinafter, the first example embodiment will be described with reference to the drawings.
[Description of Configuration]
First, a configuration of a first example embodiment will be described with reference to the drawings.

FIG. 1 is a block diagram illustrating an example of a configuration of an information processing device 1 according to the first example embodiment.

The information processing device 1 includes a data aggregation unit 10, an object inference unit 20, a training data generation unit 30, a training data storage unit 40, a model learning unit 50, a model storage unit 60, and a data acquisition unit 70.

The number of components and the connection relationship illustrated in FIG. 1 are an example. For example, the information processing device 1 may include a plurality of the data acquisition units 70. In this case, the data acquisition units 70 may acquire the inference target data from respective different devices. Alternatively, a plurality of the data acquisition units 70 may acquire data from the same device for load distribution, parallel processing, or the like.

Alternatively, for example, the information processing device 1 may include a plurality of data aggregation units 10 and a plurality of object inference units 20. In this case, the information processing device 1 may output a plurality of inference results based on the plurality of data aggregation units 10 and the plurality of object inference unit 20.

The information processing device 1 may be configured using a computer device including a central processing unit (CPU), a main memory, and a secondary storage device. In this case, the components of the information processing device 1 illustrated in FIG. 1 are implemented using a CPU or the like. Details of the hardware configuration will be described later.

The data acquisition unit 70 acquires data (hereinafter referred to as "inference target data") to be inferred by the information processing device 1 from a predetermined device. The inference target data is a set of a plurality of pieces of data each including a detection target object. The inference target data may include data that does not include the detection target object.

An input source of data in the data acquisition unit 70 is any input source. For example, the data acquisition unit 70 may acquire, as the inference target data, an image from the monitoring camera. Alternatively, the data acquisition unit 70 may acquire data stored in a storage device (not illustrated). Alternatively, the data acquisition unit 70 may acquire data from a plurality of devices.

The data aggregation unit 10 acquires the inference target data from the data acquisition unit 70 and generates data (hereinafter, referred to as "aggregate data") obtained by aggregating the acquired inference target data.

"Aggregation" is to generate data the number of pieces of which is smaller than the number of pieces of data included in the original data from the original data. The number of pieces of aggregate data to be generated may be one or more.

For example, the data aggregation unit 10 acquires, as the inference target data, a plurality of images (hereinafter, each referred to as an "inference target image") from the data acquisition unit 70. Then, the data aggregation unit 10 generates images (hereinafter, each referred to as an "aggregate image") the number of which is smaller the number of images included in the inference target image based on the inference target image.

That is, the data aggregation unit 10 generates aggregate data the number of pieces of which is smaller than the number of pieces of data included in the inference target data based on the inference target data that is a plurality of pieces of data at least some of which include the detection target object.

Then, the data aggregation unit 10 outputs the aggregate data to the object inference unit 20.

Furthermore, as will be described later, the data aggregation unit 10 acquires data to be aggregated from the training data generation unit 30 and generates learning aggregate data.

Details of the data aggregation unit 10 will be described later.

The object inference unit 20 applies the aggregate data generated by the data aggregation unit 10 to the trained model and infers a region (first region) of the detection target object in the aggregate data.

Further, the object inference unit 20 collects duplicates of the region of the detection target object inferred in the aggregate data to generate data packed with the collected duplicates.

Hereinafter, collecting duplicates of a predetermined region and generating data packed with the collected duplicates is referred to as "Packing". Data generated using "Packing" is referred to as "packed data".

The object inference unit 20 may generate, as the packed data, data packed with duplicates of the region of the inference target data related to the region inferred as the region of the detection target object in the aggregate data.

Then, the object inference unit 20 applies the packed data to the trained model and infers a region (second region) of the detection target object included in the packed data.

The object inference unit 20 may use different trained models as a trained model to which the aggregate data is applied and a trained model to which the packed data is applied. In this case, each trained model may be a trained model generated from a different model. Alternatively, each trained model may be a trained model generated using different training data in the same model.

However, the object inference unit 20 may use the same trained model as a trained model to which the aggregate data is applied and a trained model to which the packed data is applied.

Then, the object inference unit 20 infers a detection target object (for example, the BB, the class, and the confidence of the detection target object) in the inference target data based on a region (second region) of the detection target object in the packed data.

As will be described in detail later, the inference of the detection target object in the inference target data from the region (second region) of the detection target object in the packed data uses the relevant relationship of data, not the inference using the trained model. Therefore, this processing has a lower load than the inference using the trained model.

An example of the operation by the object inference unit 20 in a case where the data aggregation unit 10 generates an aggregate image from the inference target image will be described.

The object inference unit 20 applies the aggregate image generated by the data aggregation unit 10 to the trained model to infer the region of the detection target object in the aggregate image.

Then, the object inference unit 20 generates an image (hereinafter, referred to as a "packed image") obtained by collecting (packing) duplicates of the images of the region of the detection target object in the aggregate image. The object inference unit 20 may generate, as the Packed image, an image packed with duplicates of images of a region of the inference target image related to a region of the detection target object in the aggregate image.

Then, the object inference unit 20 applies the Packed image to the trained model to infer the region of the detection target object included in the Packed image.

Then, the object inference unit 20 infers the detection target object in the inference target image based on the result of the inference in the Packed image.

That is, the object inference unit 20 applies the aggregate data to the trained model and infers (primary inference) a region (first region) of the detection target object in the aggregate data. Then, the object inference unit 20 generates packed data that is data packed with duplicates of a region (first region) of the detection target object in the aggregate data or duplicates of a region of the inference target data related to the first region. Then, the object inference unit 20 applies the generated packed data to the trained model, and infers a region (second region) of the detection target object included in the packed data. Then, the object inference unit 20 infers the detection target object in the inference target data based on the region (second region) of the detection target object in the packed data.

Then, the object inference unit 20 outputs a result of the inference to a predetermined device.

In a case where the data aggregation unit 10 generates the learning aggregate data, the object inference unit 20 generates the learning packed data from the learning aggregate data.

Details of the object inference unit 20 will be described later.

The training data generation unit 30 generates the learning aggregate data from predetermined data (hereinafter, referred to as "original data") stored in the training data storage unit 40 using the data aggregation unit 10. Further, the training data generation unit 30 generates the learning packed data from the generated learning aggregate data using the object inference unit 20.

That is, the training data generation unit 30 applies the original data to the data aggregation unit 10 to generate the learning aggregate data. Further, the training data generation unit 30 applies the generated learning aggregate data to the object inference unit 20 to generate learning packed data.

The learning aggregate data and the learning packed data are used for learning of the model as described later. Therefore, hereinafter, the generated learning aggregate data and the generated learning packed data may be collectively referred to as "training data". The training data may include data (for example, the data included in the original data and/or the information indicating the correct answer data (hereinafter, referred to as a "correct answer label")) different from the learning aggregate data and the learning packed data.

The training data storage unit 40 stores the training data (the learning aggregate data and the learning packed data) generated by the training data generation unit 30 using the data aggregation unit 10 and the object inference unit 20 and the original data used to generate the training data.

An acquisition source of the original data is any acquisition source. For example, the information processing device 1 may receive original data from an external device (not illustrated) in advance and store the original data in the training data storage unit 40. Alternatively, the information processing device 1 may store data generated in advance by the training data generation unit 30 using predetermined data in the training data storage unit 40 as original data.

As a learning phase of machine learning, the model learning unit 50 applies the training data stored in the training data storage unit 40 to the model (hereinafter, referred to as a "pre-trained model") stored in the model storage unit 60 to generate a trained model. Then, the model learning unit 50 stores the generated trained model in the model storage unit 60. The trained model is a model used by the object inference unit 20 in inference.

In this manner, the model learning unit 50 applies the training data to the predetermined model to generate the trained model.

The model learning unit 50 may generate different trained models as the trained model used for the aggregate data and the trained model used for the packed data. However, the model learning unit 50 may generate one trained model as the trained model used for the aggregate data and the trained model used for the packed data.

The model storage unit 60 stores the pre-trained model and the trained model. The model storage unit 60 stores the pre-trained model in advance. For example, the operator stores the pre-trained model in the model storage unit 60 prior to the operation.

The information processing device 1 may acquire a trained model from an external device (not illustrated) and store the trained model in the model storage unit 60. In this case, the information processing device 1 may not include the training data generation unit 30, the training data storage unit 40, and the model learning unit 50.

In the information processing device 1, the training data storage unit 40 and the model storage unit 60 may be provided in an external device (not illustrated).

Next, details of the data aggregation unit 10 and the object inference unit 20 will be described. In the following description, an image will be used as an example of inference target data for comparison with the explanatory drawings.

(Aggregation of Data)

First, generation of an aggregate image in the data aggregation unit 10 will be described.

The data aggregation unit 10 generates images (aggregate images) the number of which is smaller than the number of images included in the inference target image from the inference target image acquired from the data acquisition unit 70.

The number of images is an example of an index in generating an aggregate image. The data aggregation unit 10 may generate an aggregate image using an index different from the number of images. For example, the data aggregation unit 10 may use the area as an index. For example, the data aggregation unit 10 may generate one or a plurality of aggregate images in such a way that the area of the aggregate image (the total area of the aggregate images in a case where there is a plurality of aggregate images) is narrower than the area of a combination of the images included in the inference target image.

In the following description of the present example embodiment, as an example, the number of images is used as an index. However, this does not limit the index used in the aggregation to the number of images.

When the learning aggregate data is generated, the data aggregation unit 10 acquires data to be aggregated (original data) from the training data generation unit 30 and generates aggregate data (learning aggregate data).

Figure 2:
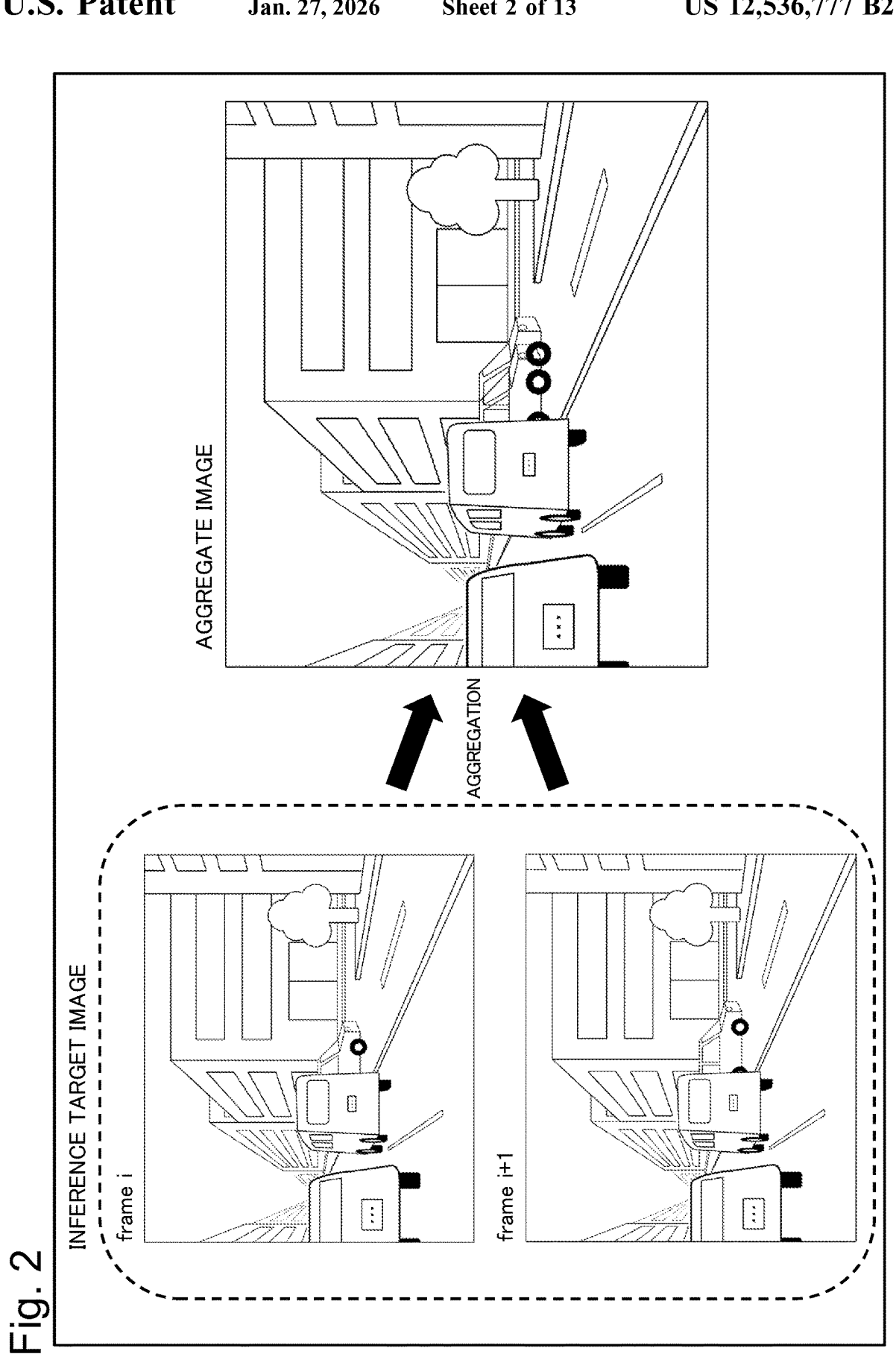
FIG. 2 is a diagram illustrating an example of an aggregate image.

FIG. 2 is a diagram illustrating an example of an aggregate image.

The data aggregation unit 10 aggregates two inference target images ("frame i" and "frame i+1") on the left side of FIG. 2 to generate one aggregate image on the right side. For example, the image of the vehicle on the center right of the aggregate image is a vehicle in which images of two frames are aggregated. Since the other vehicles and the like are at the same position in the two images (for example, since the vehicle is stopped), the images of the two original frames are the same in the aggregate image.

Further, the data aggregation unit 10 stores a relevant relationship (hereinafter, referred to as a "first relevant relationship") between an image included in the inference target image and the aggregate image when generating the aggregate image. For example, the data aggregation unit 10 stores coordinate transformation (hereinafter, referred to as "first coordinate transformation") when generating an aggregate image from a plurality of images included in the inference target image in association with the aggregate image.

The number of generated aggregate images is any number as long as it is smaller than the number of images included in the inference target image. The data aggregation unit 10 may generate one aggregate image or may generate a plurality of aggregate images equal to or more than two.

The aggregation method in the data aggregation unit 10 is any method as long as the number of images can be reduced. Next, an example of an aggregation method will be described.

For example, the data aggregation unit 10 may average the inference target images to generate an aggregate image. In this case, for example, the data aggregation unit 10 calculates an average value of values (pixel values) of pixels at the same position in respective images of the inference target image, and sets the calculated average value as a value (pixel value) of a related pixel in the aggregate image.

In a case of generating a plurality of aggregate images, the data aggregation unit 10 may divide the inference target image into a plurality of groups, and set the average value of the images of each group as the pixel value of the aggregate image. At least some of the groups may include a common image as part of the image.

Alternatively, the data aggregation unit 10 may use a maximum value or a minimum value of values of pixels at the same position in the images included in the inference target image as the pixel value of the aggregate image.

The data aggregation unit 10 may apply predetermined processing to the inference target image before generating the aggregate image.

For example, the data aggregation unit 10 may apply left-right inversion, up-down inversion, hue adjustment, parallel movement, rotation, enlargement or reduction, partial cutout, and a combination thereof to the inference target image.

The data aggregation unit 10 may apply processing different from processing of other images to at least some of the images included in the inference target image.

Alternatively, the data aggregation unit 10 may generate the aggregate image after removing the background component.

A method of removing the background component is any method. For example, the data aggregation unit 10 may subtract the pixel value of the background image from the pixel value of the image as the removal of the background component.

A method of acquiring the background image is any method. For example, the data aggregation unit 10 may acquire the background image from the operator in advance. Alternatively, the data aggregation unit 10 may acquire the background image when acquiring the inference target image.

Alternatively, the data aggregation unit 10 may generate the background image from the inference target image.

For example, in a case where the inference target image is an image captured using the same fixed imaging device, the background is fixed. Therefore, the data aggregation unit 10 may store the inference target images used to generate the aggregate image in the past, and may use an image obtained by averaging the stored inference target images as the background image.

Further, the data aggregation unit 10 may use a weight for generating the background image. For example, the data aggregation unit 10 may set, to the background image, a weighted average value (weighted average value) in which a larger weight is applied to an inference target image acquired later among the stored inference target images.

Alternatively, the data aggregation unit 10 may request the object inference unit 20 to infer the detection target object in the inference target image, and may set a region excluding a region of the detection target object detected as a result of the inference as the background image.

(Inference of Object)

Next, inference in the object inference unit 20 will be described. The object inference unit 20 performs two types of inference: primary inference and secondary inference.

(1) Primary Inference

The primary inference is inference using an aggregate image.

The object inference unit 20 applies the aggregate image to the trained model and infers a region (for example, BB) of the detection target object included in the aggregate image.

Figure 3:
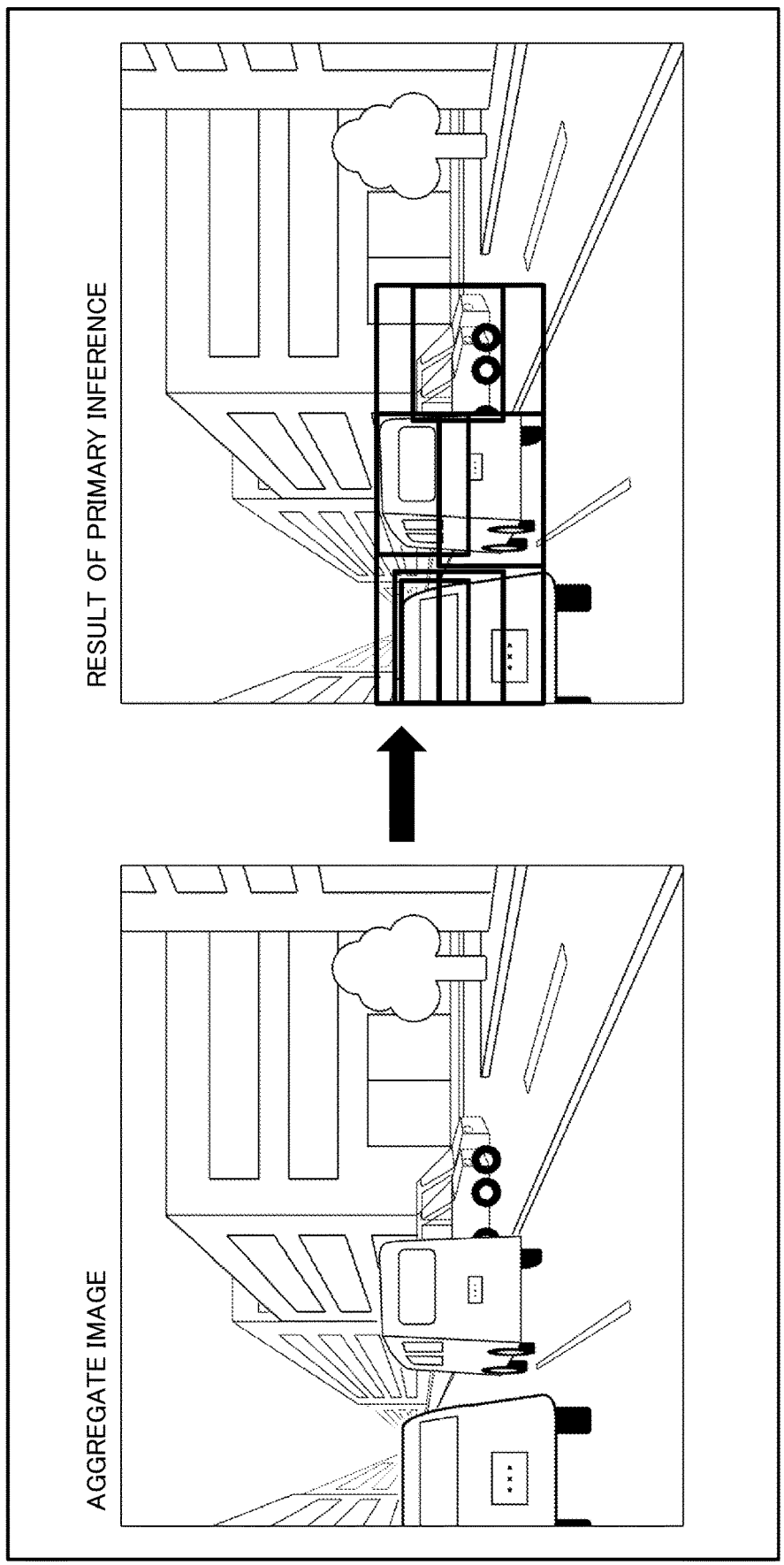
FIG. 3 is a diagram illustrating an example of a result of primary inference.

FIG. 3 is a diagram illustrating an example of a result of primary inference.

A rectangle in the right diagram of FIG. 3 is the result (BB) of the primary inference using the left aggregate image. The object inference unit 20 infers the class and confidence in addition to the BB. However, in FIG. 3, the display of the class and the confidence is omitted.

As a result of the inference, the object inference unit 20 may infer a BB obtained by collecting overlapping BBs and/or BBs located close to each other. For example, in the diagram on the right side of FIG. 3, the largest rectangle is an example of the BB that collects the inferred BBs.

In this manner, the object inference unit 20 infers the region of the detection target object included in the aggregate image. The aggregate image has a smaller number of images than the inference target image that is the aggregation source. Therefore, the information processing device 1 can perform the inference using the aggregate image in a time shorter than the time in the case of the inference using the inference target image that is the aggregation source.

Then, the object inference unit 20 generates an image (hereinafter, referred to as a "packed image") obtained by collecting (packing) duplicates (copies) of the images of the obtained region.

The object inference unit 20 may generate, as the Packed image, an image packed with duplicates of the images of the region of the inference target image related to the region inferred as the region of the detection target object in the aggregate image.

Figure 4:
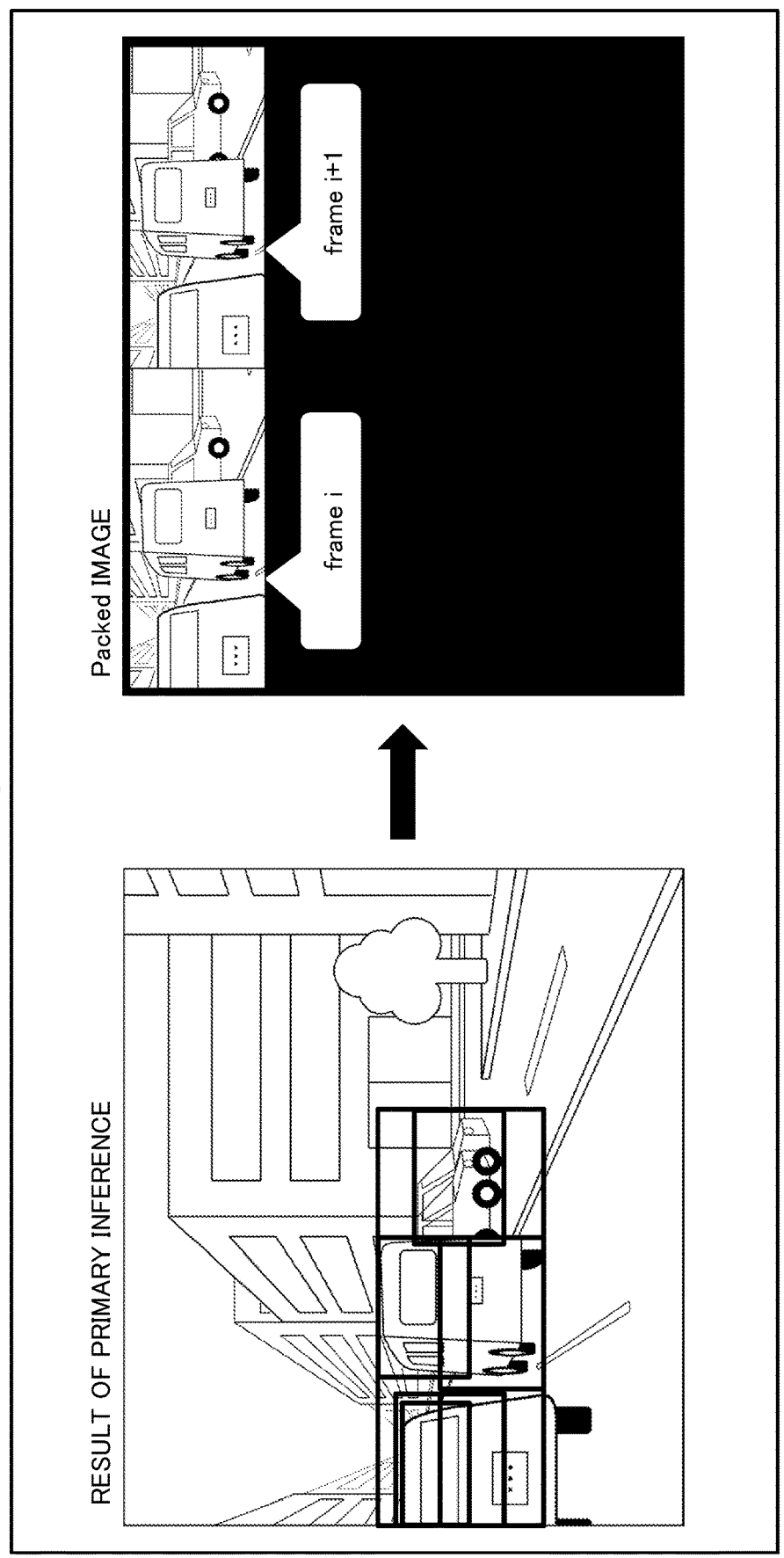
FIG. 4 is a diagram illustrating an example of a Packed image.

FIG. 4 is a diagram illustrating an example of a Packed image.

The right diagram in FIG. 4 is a Packed image packed with duplicates of a region related to the region (largest BB) in the left diagram. In FIG. 4, the object inference unit 20 duplicates the image region of the inference target image (frame i and frame i+1) related to the region inferred as the region of the detection target object in the aggregate image in the Packed image.

The object inference unit 20 may duplicate a region of an image in which some or all of the image regions in which the detection target object is inferred are put together in the Packed image.

For example, in FIG. 4, the object inference unit 20 duplicates an image related to the widest region (a region in which all the regions of the objects to be detected are put together) among the regions inferred as the regions of the objects to be detected in the aggregate image.

However, the object inference unit 20 may duplicate an image related to some of the regions inferred as the regions of the detection target object in the aggregate image.

In the example illustrated in FIG. 4, the total area of the image regions duplicated from the inference target image is smaller than the area of the Packed image. Therefore, the Packed image includes a surplus region (black region in the right diagram of FIG. 4).

The object inference unit 20 may pack the surplus region with a duplicate of another image. For example, in a case where the object inference unit 20 further performs "Packing" based on another aggregate image, the object inference unit 20 may duplicate an image to be added based on another aggregate image in the surplus region. In a case where the image to be duplicated as an addition cannot be completely accommodated in the surplus region, the object inference unit 20 may duplicate the image that has not accommodated in a new Packed image.

In this manner, the object inference unit 20 may generate the Packed image based on a plurality of aggregate images.

Further, when generating the Packed image from the aggregate image, the object inference unit 20 stores a relevant relationship (hereinafter, referred to as a "second relevant relationship") between the image region of the detection target object in the aggregate image and the image region in the Packed image. For example, the object inference unit 20 stores information related to coordinate transformation (hereinafter, referred to as "second coordinate transformation") between the image region in the aggregate image and the image region in the Packed image in association with the Packed image.

In the secondary inference to be described next, the object inference unit 20 estimates a region of the aggregate image related to a region in which an object is inferred to exist in the Packed image, and infers an object in the inference target image based on the estimated region of the aggregate image.

However, for example, in a case where the data aggregation unit 10 generates the aggregate image using averaging, the pixel value of the aggregate image is an average value of the pixel values of the plurality of images included in the inference target image. Therefore, in a case where the aggregate image is generated using the average value, it may be difficult to identify which image in the inference target image that is the source of the aggregate image the region of the aggregate image related to the region in which the object is inferred to exist in the Packed image is in the secondary inference.

Therefore, as already described, when generating the Packed image, the object inference unit 20 may generate the Packed image by duplicating an image of a related region in the inference target image used to generate the aggregate image for each image region of the detection target object in the aggregate image. In this case, the object inference unit 20 may use the first relevant relationship to determine the region to be duplicated in the inference target image.

Then, in this case, the object inference unit 20 stores, as the second relevant relationship, a relevant relationship between an image region of an image (inference target image) to be a duplicate source and an image region of the Packed image in association with the Packed image. In other words, in this case, the second relevant relationship (for example, second coordinate transformation) is a relevant relationship (for example, coordinate transformation) between the region of the image to be the duplication source (inference target image) and the image region of the Packed image.

In this way, when the Packed image is generated using the duplicate of the inference target image, it is easy to identify the region of the image in the inference target image from the region of the image in which the object is inferred to exist in the Packed image.

In this manner, the object inference unit 20 generates the Packed image based on the aggregate image as a result of the primary inference. The object inference unit 20 stores a second relevant relationship (for example, second coordinate transformation) that is a relevant relationship between the aggregate image (alternatively, the inference target image) and the Packed image.

In a case of generating the learning packed data, the object inference unit 20 generates the learning packed data using the learning aggregate data.

(2) Secondary Inference

The secondary inference is inference using a Packed image.

The object inference unit 20 applies the Packed image to the trained model to infer a region (for example, BB, class, and confidence) of the detection target object included in the Packed image.

Figure 5:
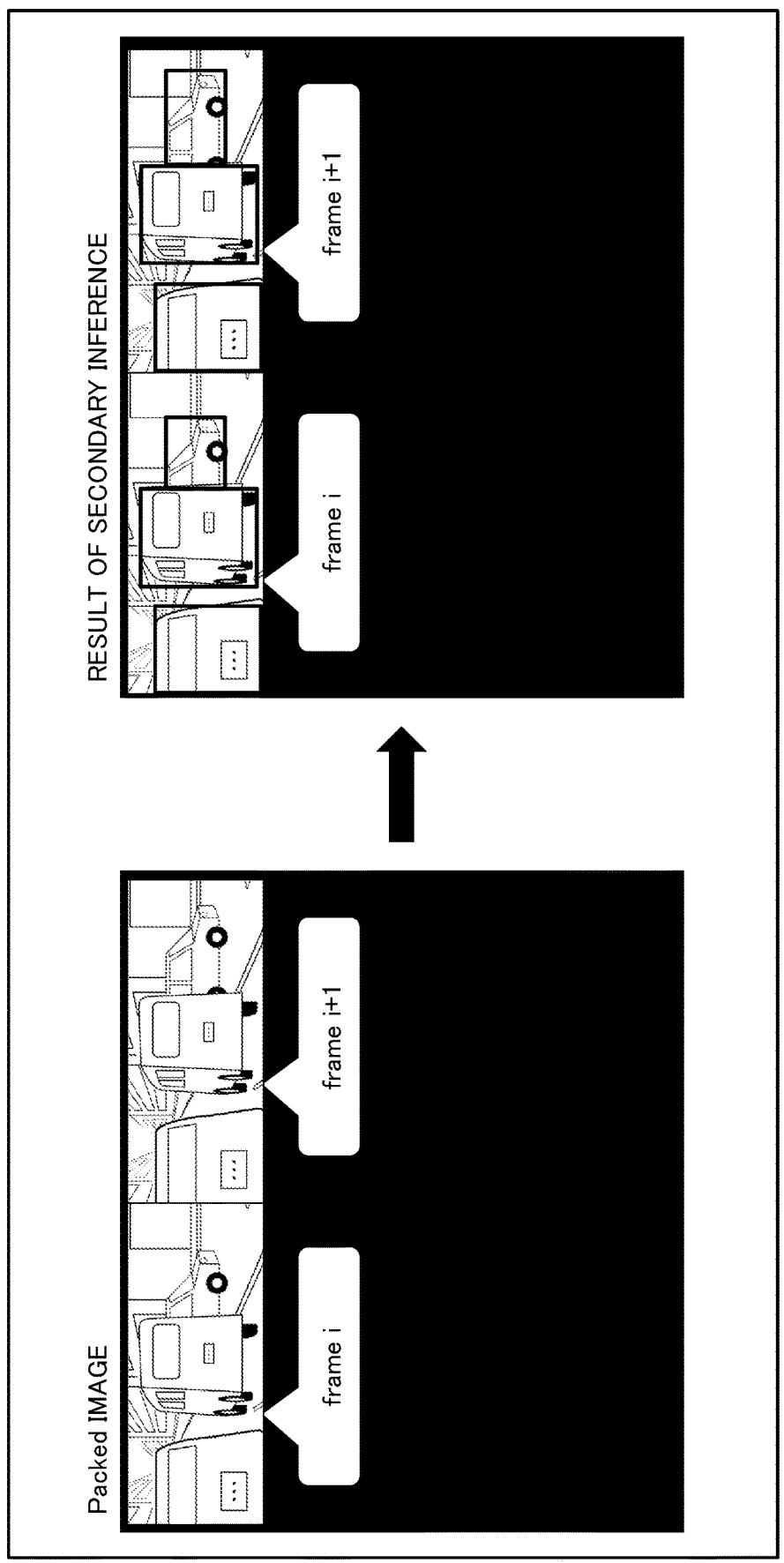
FIG. 5 is a diagram illustrating an example of a result of secondary inference.

FIG. 5 is a diagram illustrating an example of a result of secondary inference.

A rectangle in the right diagram of FIG. 5 displays a result (BB) of secondary inference using the left Packed image. FIG. 5 omits display of the class and the confidence.

In a case where the BB obtained as a result of the secondary inference is larger than the region duplicated in the Packed image or in a case where the BB straddles the duplicated region, the object inference unit 20 may not use such a BB.

Then, the object inference unit 20 infers the detection target object in the inference target image based on the result of the inference in the Packed image.

Figure 6:
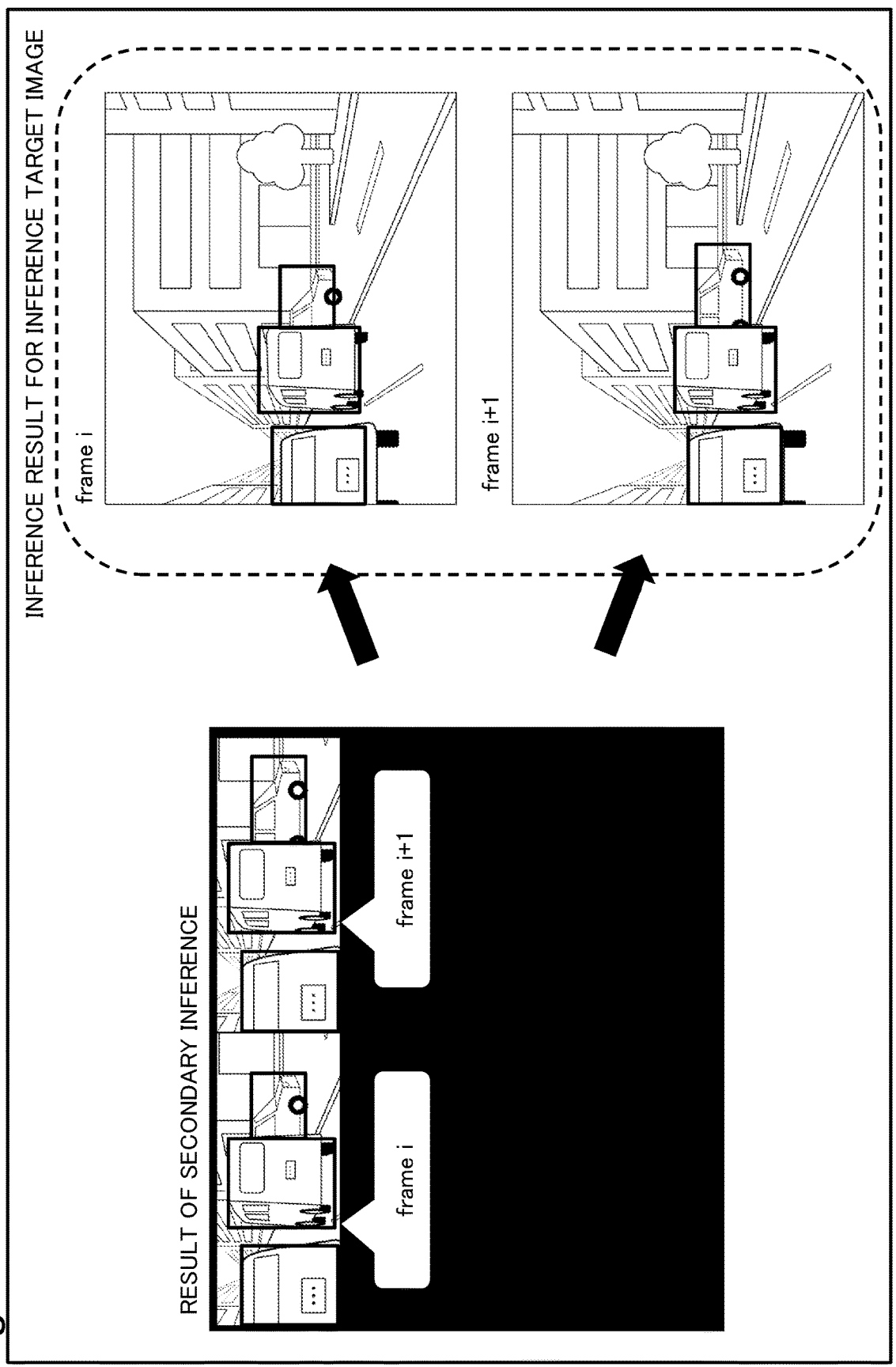
FIG. 6 is a diagram illustrating an example of a generated inference result.

FIG. 6 is a diagram illustrating an example of a generated inference result. FIG. 6 omits display of the class and the confidence.

The two diagrams on the right side of FIG. 6 are inference results (BB) in the inference target image based on the results of the secondary inference on the left side. FIG. 6 omits display of the class and the confidence.

Specifically, the object inference unit 20 infers the detection target object in the inference target image as follows, for example.

The object inference unit 20 infers the detection target object in the aggregate image from the result of the inference of the detection target object in the Packed image using the relevant relationship (second coordinate transformation) between the Packed image and the aggregate image. Then, the object inference unit 20 infers the detection target object in the inference target image from the result of the inference of the detection target object in the aggregate image using the relevant relationship (first coordinate transformation) between the aggregate image and the inference target image.

That is, the object inference unit 20 infers the detection target object in the inference target image from the result of the inference of the detection target object in the Packed image using the second coordinate transformation and the first coordinate transformation (for example, the inverse transform of the coordinate transform may be used).

In a case where the Packed image is generated by duplicating the inference target image used to generate the aggregate image, the second coordinate transformation is the coordinate transformation between the Packed image and the inference target image. Therefore, in this case, the object inference unit 20 infers the detection target object in the inference target image from the inference result in the Packed image using the inverse transformation of the second coordinate transformation.

In this manner, the object inference unit 20 infers the detection target object of the inference target image using the Packed image.

Generally, the region of the detection target object is part of the inference target image. Therefore, also in the aggregate image, the region of the detection target object is part of the image. The Packed image is an image obtained by collecting (packing) regions estimated to include the detection target object in the aggregate image.

In a case where the Packed image is generated using the aggregate image, the number of Packed images is smaller than the number of aggregate images. Alternatively, in a case where a Packed image is generated using an inference target image, the number of Packed images is smaller than the number of inference target images.

Therefore, the information processing device 1 can perform inference (secondary inference) using the Packed image in a time shorter than the processing time in a case where the inference is performed using the inference target image.

Since the aggregate image is an image obtained by aggregating the inference target images, a ratio of regions not including an object is often large.

On the other hand, the Packed image is an image obtained by duplicating an image related to a region inferred to include an object in the aggregate image. Therefore, the object inference unit 20 can reduce the processing of inference for a region not including an object by using the Packed image. That is, the object inference unit 20 can improve the efficiency of processing required for inference.

In the generation of the Packed image, the object inference unit 20 may combine overlapping image regions and/or image regions closer than a predetermined distance into one image region among the image regions inferred as the regions of the detection target object in the primary inference. When overlapping and/or close image regions are collected in this manner, the object inference unit 20 can reduce the possibility of redundantly inferring the same object and/or the possibility of overlooking the object in the secondary inference.

Alternatively, the object inference unit 20 may change the size of the image to be duplicated when duplicating the image in the Packed image based on the aggregate image.

When the image region to be duplicated in the Packed image is reduced, the area required for duplication of the image region is reduced. Therefore, the number of Packed images to be generated is reduced. As a result, the object inference unit 20 may be able to shorten the time of inference (secondary inference) using the Packed image.

On the other hand, in a case where the image region to be duplicated in the Packed image is enlarged, the object inference unit 20 may be able to improve the recognition accuracy of the secondary inference.

Therefore, for example, the operator may set the content of change in the size of the image to be duplicated in the object inference unit 20 in advance in consideration of the detection target object.

Alternatively, the object inference unit 20 may determine to change the size of the image region.

For example, the object inference unit 20 may determine whether to change the size of the image region based on the size of the image region.

For example, the object inference unit 20 may change the size of the image region that does not fall within the range of the size specified in advance to the specified size. That is, the object inference unit 20 may change the size of the image region in such a way as to fall within a predetermined range.

Alternatively, the object inference unit 20 may determine whether to change the size of the image region and the size after the change, using the result of the primary inference (for example, the position of the BB in the image, the size of the BB, the class of the object, or the confidence).

The information processing device 1 may use different image sizes in some or all images of the inference target image, the aggregate image, and the Packed image. For example, the operator of the information processing device 1 may select each image size based on a processing performance of the information processing device 1, a performance efficiency on hardware used for the processing performance, desired calculation accuracy, and the like.

[Description of Operation]

Next, an example of an operation in the information processing device 1 according to the first example embodiment will be described with reference to the drawings.

(A) Operation of Generating Trained Model

Figure 7:
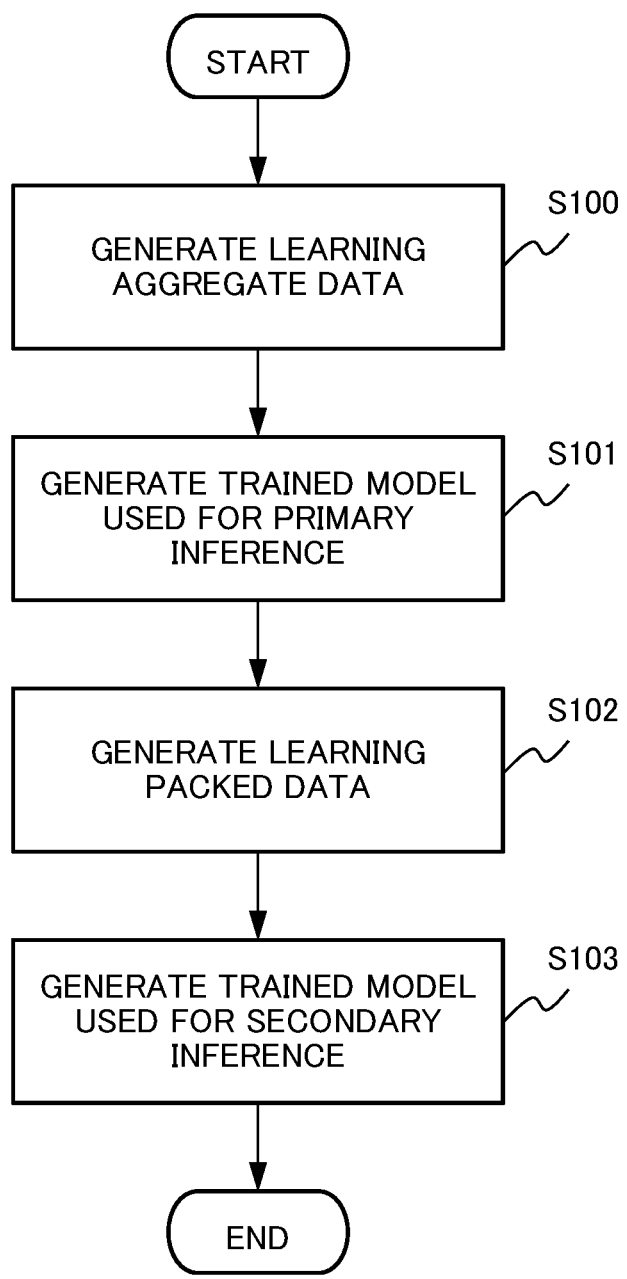
FIG. 7 is a flowchart illustrating an example of an operation of machine learning in the information processing device according to the first example embodiment.

FIG. 7 is a flowchart illustrating an example of an operation of machine learning in the information processing device 1 according to the first example embodiment.

Prior to the operation, the training data storage unit 40 stores the original data. The model storage unit 60 stores a pre-trained model.

The information processing device 1 starts an operation of machine learning (generation of a trained model) in response to a predetermined condition.

For example, the information processing device 1 starts an operation of machine learning in response to an instruction from an operator of the information processing device 1. In this case, the information processing device 1 may receive information (for example, parameter) necessary for generating the trained model from the operator in accordance with the instruction. The parameter is appropriately determined in accordance with the model. The parameter is, for example, designation of original data used for learning or a value related to machine learning.

The information processing device 1 may receive other information in addition to the parameter necessary for generating the trained model. For example, the information processing device 1 may receive the original data from the operator. In this case, the information processing device 1 may start the operation after storing the received original data in the training data storage unit 40.

The training data generation unit 30 generates the learning aggregate data (step S100). Specifically, the training data generation unit 30 operates as follows.

The training data generation unit 30 acquires the original data from the training data storage unit 40. Then, the training data generation unit 30 provides the original data to the data aggregation unit 10 and causes the data aggregation unit 10 to generate aggregate data from the original data. The generated aggregate data is the learning aggregate data.

The training data generation unit 30 may add information (for example, a correct answer label indicating correct answer data) necessary for machine learning to the learning aggregate data.

The training data generation unit 30 stores the generated learning aggregate data in the training data storage unit 40.

The model learning unit 50 acquires the learning aggregate data from the training data storage unit 40. Then, the model learning unit 50 performs machine learning of the pre-trained model stored in the model storage unit 60 using the acquired learning aggregate data, and generates a trained model used for primary inference by the object inference unit 20 (step S101). Then, the model learning unit 50 stores the generated trained model in the model storage unit 60.

Next, the training data generation unit 30 generates the learning packed data (step S102). Specifically, the training data generation unit 30 operates as follows.

The training data generation unit 30 acquires the learning aggregate data from the training data storage unit 40. Then, the training data generation unit 30 provides the learning aggregate data to the object inference unit 20 to cause the object inference unit 20 to generate the packed data. The generated packed data is the learning packed data.

The training data generation unit 30 may add information (for example, a correct answer label indicating correct answer data) necessary for machine learning to the learning packed data.

The training data generation unit 30 stores the generated learning packed data in the training data storage unit 40.

The model learning unit 50 acquires the learning packed data from the training data storage unit 40. Then, the model learning unit 50 performs machine learning of the pre-trained model stored in the model storage unit 60 using the learning packed data, and generates a trained model used for secondary inference by the object inference unit 20 (step S103). Then, the model learning unit 50 stores the generated trained model in the model storage unit 60.

The model learning unit 50 may use different pre-trained models in steps S101 and S103. Alternatively, the model learning unit 50 may perform learning using the same pre-trained model in steps S101 and S103.

Alternatively, in a case where the object inference unit 20 uses the same trained model for the inference of the aggregate data and the inference of the packed data, the model learning unit 50 may use the trained model generated in step S101 instead of the pre-trained model in step S103.

The training data generation unit 30 may output the learning aggregate data and the learning packed data to the model learning unit 50.

Alternatively, the training data generation unit 30 and the model learning unit 50 may operate independently. The operation in this case will be described.

The training data generation unit 30 applies predetermined data (original data) to the data aggregation unit 10 to generate the learning aggregate data (step S100). Subsequently, the training data generation unit 30 applies the generated learning aggregate data to the object inference unit 20 to generate the learning packed data (step S102). Then, the training data generation unit 30 stores the generated learning aggregate data and the generated learning packed data in the training data storage unit 40.

Then, at a predetermined time point, the model learning unit 50 generates a trained model to which the aggregate data is applied using the stored learning aggregate data (step S101). Further, the model learning unit 50 generates a trained model to which the packed data is applied using the stored learning packed data (step S103). Then, the model learning unit 50 stores the generated trained model in the model storage unit 60.

Using such an operation, the information processing device 1 generates a trained model.

The information processing device 1 may perform a predetermined operation after the end of step S103. For example, the information processing device 1 may notify the operator of the end of generation of the trained model.

(B) Inference Operation

Next, an operation in which the information processing device 1 infers a detection target object using the inference target data acquired by the data acquisition unit 70 will be described with reference to the drawings.

Figure 8:
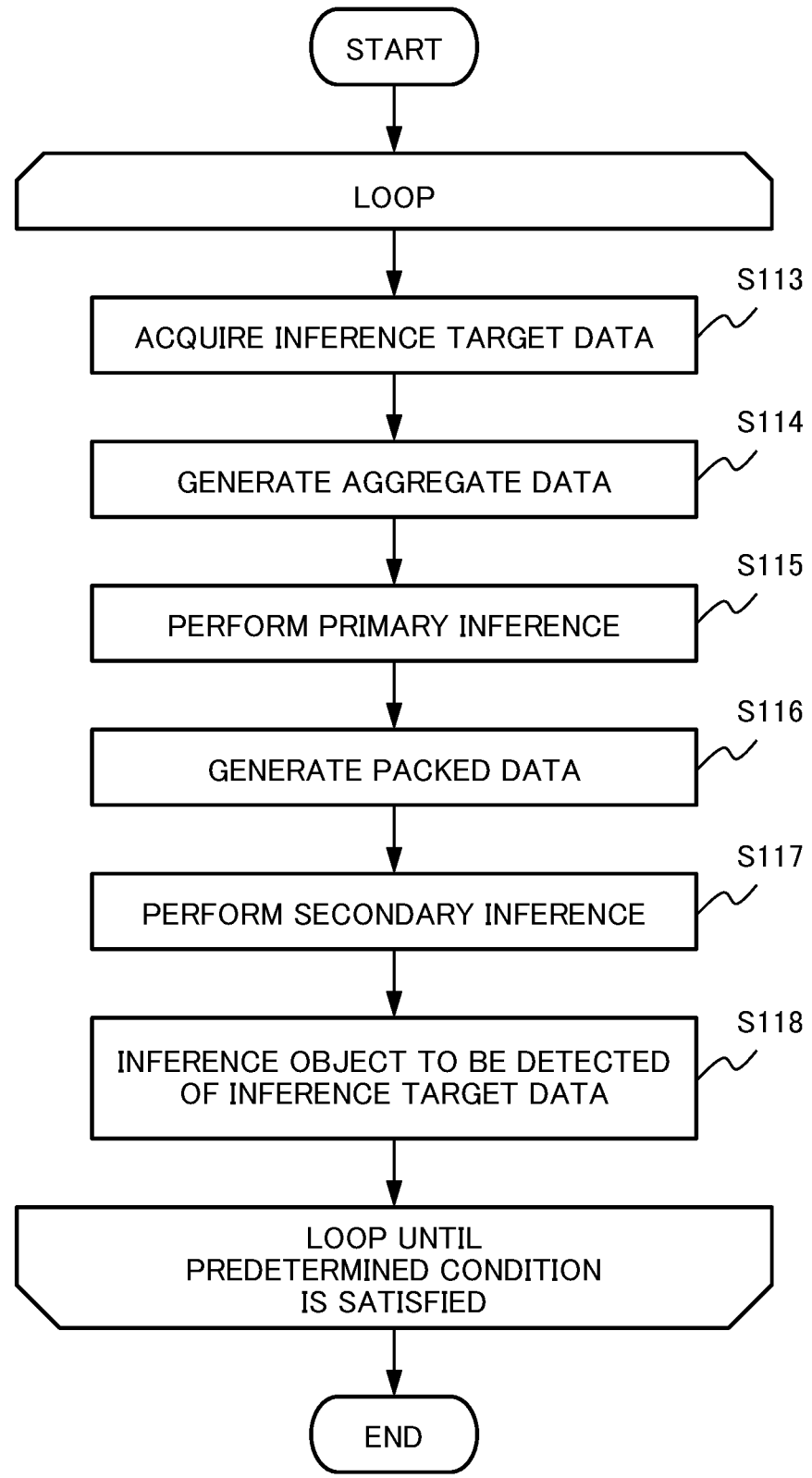
FIG. 8 is a flowchart illustrating an example of inference operation in the information processing device according to the first example embodiment.

FIG. 8 is a flowchart illustrating an example of inference operation in the information processing device 1 according to the first example embodiment.

The model storage unit 60 stores the trained model.

In a case where the model storage unit 60 does not store the trained model, the information processing device 1 may start the inference operation after performing the above-described "(A) operation of generating trained model" to generate the trained model.

The information processing device 1 starts an inference operation in response to a predetermined condition.

For example, the information processing device 1 starts an inference operation in response to an instruction from an operator of the information processing device 1. Alternatively, the information processing device 1 may automatically start the inference operation after activation of the device.

The information processing device 1 may receive a parameter (for example, in a case where the model storage unit 60 stores a plurality of trained models, designation of a trained model to be used for inference) related to the operation from the operator at the start of the operation.

Alternatively, the information processing device 1 may use a parameter given in advance (for example, designation of a trained model).

The object inference unit 20 may use different trained models in the primary inference and the secondary inference. Alternatively, the object inference unit 20 may use the same trained model.

The information processing device 1 repeats the operation of FIG. 8 until the predetermined condition instructed by the operator is satisfied. The predetermined condition is, for example, reception of an end instruction from the operator. However, the predetermined condition is not limited to the above, and may be any condition. For example, the operator determines a condition in advance in consideration of the inference target data, the detection target object, and the trained model, and sets the determined condition in the information processing device 1.

The data acquisition unit 70 acquires inference target data (step S113). For example, the data acquisition unit 70 acquires a predetermined number of images.

The data aggregation unit 10 generates aggregate data based on the inference target data (step S114). The data aggregation unit 10 may generate one piece of aggregate data or may generate a plurality of pieces of aggregate data.

The object inference unit 20 performs primary inference using the generated aggregate data (step S115).

The object inference unit 20 generates the packed data from the aggregate data or the inference target data based on the result of the primary inference (step S116). Specifically, the object inference unit 20 generates packed data obtained by duplicating a region of the aggregate data or a region of the inference target data related to a region (for example, BB) of the detection target object inferred in the aggregate data.

In the result of the primary inference, the object inference unit 20 may generate the packed data by combining the regions partially overlapping and/or regions close in position into one.

The object inference unit 20 performs secondary inference on the generated packed data (step S117).

The object inference unit 20 infers the detection target object in the inference target data based on the result of the secondary inference and the first and second relevant relationship (for example, first and second coordinate transformations) (step S118).

The information processing device 1 repeats the operation described with reference to FIG. 8 until the predetermined condition is satisfied, and performs inference for the inference target data.

Then, the information processing device 1 outputs a result of the inference to a predetermined device.

The information processing device 1 may repeatedly perform the operations of steps S113 to S118 at a predetermined cycle instead of the loop operation repeated until the predetermined condition as described above is satisfied.

[Description of Effects]

Next, effects of the first example embodiment will be described.

The information processing device 1 according to the first example embodiment can achieve an effect of shortening the inference time of the detection target object.

The reason is as follows.

The information processing device 1 includes the data aggregation unit 10 and the object inference unit 20. The data aggregation unit 10 generates aggregate data the number of pieces of which is smaller than the number of pieces of data included in the inference target data based on the inference target data that is a plurality of pieces of data at least some of which include the detection target object. As the primary inference, the object inference unit 20 applies the aggregate data to the trained model to infer a first region that is a region of the detection target object in the aggregate data. Then, the object inference unit 20 generates packed data that is data packed with a duplicate of the first region or a duplicate of the region of the inference target data related to the first region. Then, the object inference unit 20 applies the packed data to the trained model as the secondary inference to infer the second region that is the region of the detection target object included in the packed data. Then, the object inference unit 20 infers a detection target object in the inference target data based on the second region.

The inference target data is a plurality of pieces of data at least some of which include the detection target object. The data aggregation unit 10 generates aggregate data the number of pieces of which is smaller than the number of pieces of inference target data based on the inference target data. Then, the object inference unit 20 infers a region of the detection target object in the aggregate data as the primary inference.

The number of pieces of the aggregate data is smaller than the number of pieces of inference target data. That is, in the primary inference, the object inference unit 20 performs inference using aggregate data the number of pieces of which is a smaller than the number of pieces of included in the inference target data.

Further, the object inference unit 20 generates the packed data packed with the data related to the region including the detection target object in the aggregate data based on the result of the primary inference. Then, the object inference unit 20 infers a region of the detection target object in the packed data as the secondary inference. Then, the object inference unit 20 infers a region including the detection target object in the inference target data based on the result of inference in the packed data.

Generally, a region including the detection target object is part of the inference target data. The packed data is data generated by packing the data with a duplicate of the region of the detection target object. For example, when the packed data is generated using the region of the inference target data, the number of pieces of packed data is smaller than the number of pieces of inference target data.

As described above, since the information processing device 1 performs inference using the data the number of pieces which is smaller than that of the inference target data as the primary inference and the secondary inference, the time required for inference can be shortened.

The time reduction will be described using an image. Processing other than inference such as image aggregation has a considerably smaller calculation load than processing of inference (in particular, inference using the trained model). Therefore, in the following description, the time of these processing will be omitted, and the load of inference will be described using the number of times of inference using the trained model.

In a general object detection task, the number of images included in an inference target image is the number of times of execution of inference.

On the other hand, the number of times of execution of inference in the information processing device 1 is the sum of the number of times of execution of primary inference and the number of times of execution of secondary inference.

The number of times of execution of the primary inference is the same as the number of aggregate images. Then, the number of aggregate images is smaller than the number of inference target images. That is, the number of times of execution of the primary inference is smaller than the number of images included in the inference target image.

The number of times of execution of the secondary inference is the same as the number of Packed images. The number of Packed images depends on the number and the size of the objects to be detected inferred in the primary inference. However, in general, the proportion of the area occupied by the detection target object in the inference target image and the aggregate image is often considerably small. Therefore, the number of Packed images (that is, the number of times of execution of secondary inference) is expected to be considerably smaller than the number of images included in the inference target image and the number of aggregate images.

Therefore, the number of times of execution of inference in the information processing device 1, that is, "the number of aggregate images+the number of Packed images" is often considerably smaller than "the number of inference target images".

Therefore, the information processing device 1 can reduce the number of times of execution of inference, compared with the number of times of execution of inference in a case where the inference target image is individually inferred. As a result, the information processing device 1 can shorten the inference time.

When the packed data is generated using the region of the aggregate data, the number of pieces of the packed data is smaller than the number of pieces of the aggregate data. Then, the number of pieces of aggregate data is smaller than the number of pieces of inference target data. Therefore, in this case, the information processing device 1 can further shorten the time required for the secondary inference.

The packed data is data packed with a region inferred to include the detection target object. Therefore, in the secondary inference in the object inference unit 20, the ratio of the inference to the region not including the detection target object is low. Therefore, the information processing device 1 can improve inference efficiency.

As a method of shortening the time for object detection in the image of the monitoring camera, a method of the monitoring camera or a device around the monitoring camera performing inference (that is, the processing in the edge environment) can be considered.

However, an edge environment in which a monitoring camera is installed has many restrictions on installation. For example, in an edge environment, a place where a high-performance device can be installed cannot be secured in some cases. Alternatively, in the edge environment, the power that can be supplied, the cooling capacity, and the like are often restricted. As described above, in the device that can be installed in the edge environment, the available calculation resources are often limited. Therefore, when the object detection task is performed in the edge environment, a lot of time is required for processing. Therefore, in order to perform the object detection task in the edge environment, it is desired to shorten the processing time.

Since the inference time can be shortened based on the above operation, the information processing device 1 can be used in an environment in which resources are limited, such as an edge environment.

The information processing device 1 further includes the model learning unit 50. The model learning unit 50 applies the training data to a predetermined model (pre-trained model) to generate a trained model.

Using the above configuration, the information processing device 1 can generate a trained model used for inference without using another device.

The information processing device 1 further includes the training data generation unit 30. The training data generation unit 30 applies predetermined data (original data) to the data aggregation unit 10 to generate the learning aggregate data. Further, the training data generation unit 30 applies the generated learning aggregate data to the object inference unit 20 to generate learning packed data. Then, the model learning unit 50 generates a trained model to which the aggregate data is applied using the generated learning aggregate data. Further, the model learning unit 50 generates a trained model to which the packed data is applied using the generated learning packed data.

The information processing device 1 can generate the training data for the trained model used for inference using the above configuration and generate the trained model using the generated training data.

[Hardware Configuration]

In the above description, an example in which the data aggregation unit 10, the object inference unit 20, the training data generation unit 30, the training data storage unit 40, the model learning unit 50, the model storage unit 60, and the data acquisition unit 70 are included in the same device (information processing device 1) is described. However, the configuration of the first example embodiment is not limited thereto.

For example, the information processing device 1 may be configured by connecting devices having functions related to the respective configurations via a predetermined network. For example, the information processing device 1 may be achieved using cloud computing.

Alternatively, each component of the information processing device 1 may be configured by an individual hardware circuit.

Alternatively, in the information processing device 1, a plurality of components may be configured by one piece of hardware.

Alternatively, the information processing device 1 may be achieved as a computer device including a CPU, a read only memory (ROM), and a random access memory (RAM). In addition to the above configuration, the information processing device 1 may be achieved as a computer device including a network interface circuit (NIC). Alternatively, the information processing device 1 may be achieved as a computer device further including an arithmetic logic unit (ALU) that performs calculation processing of part or all of learning and inference.

Figure 9:
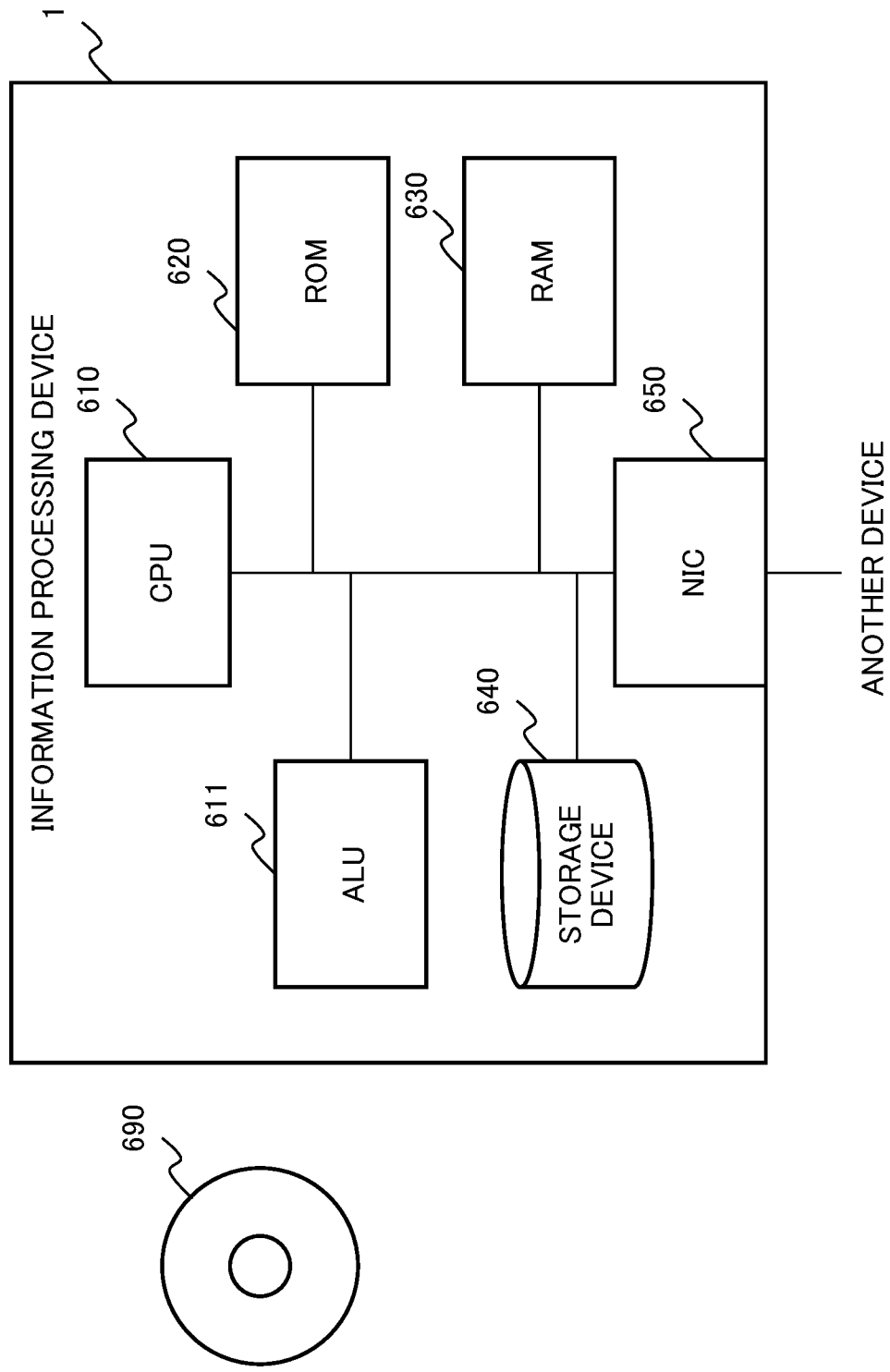
FIG. 9 is a block diagram illustrating an example of a hardware configuration.

FIG. 9 is a block diagram illustrating an example of a hardware configuration of the information processing device 1.

The information processing device 1 includes a CPU 610, an ALU 611, a ROM 620, a RAM 630, a storage device 640, and an NIC 650, and constitutes a computer device. However, the information processing device 1 may not include the ALU 611.

The CPU 610 reads a program from the ROM 620 and/or the storage device 640. Then, the CPU 610 controls the ALU 611, the RAM 630, the storage device 640, and the NIC 650 based on the read program. Then, the computer device including the CPU 610 controls these configurations and implements the functions of the components illustrated in FIG. 1. The components illustrated in FIG. 1 are the data aggregation unit 10, the object inference unit 20, the training data generation unit 30, the training data storage unit 40, the model learning unit 50, the model storage unit 60, and the data acquisition unit 70.

When achieving each function, the CPU 610 may use the RAM 630 or the storage device 640 as a temporary storage medium of the program and the data.

The CPU 610 may read the program included in a recording medium 690 storing the program in a computer readable manner using a recording medium reading device (not illustrated). Alternatively, the CPU 610 may receive a program from an external device (not illustrated) via the NIC 650, store the program in the RAM 630 or the storage device 640, and operate based on the stored program.

The ALU 611 is in charge of predetermined calculation processing and part of predetermined processing in the CPU 610. For example, the ALU 611 is controlled by the CPU 610 to execute part or all of the calculation processing of learning and inference. For example, the ALU 611 is a graphics processing unit (GPU) or a field-programmable gate array (FPGA). Alternatively, the ALU 611 may be, for example, an application specific integrated circuit (ASIC). Information (data, program, circuit information, and the like) necessary for execution of calculation in the ALU 611 is stored in advance in the ROM 620, the RAM 630, or the storage device 640.

The ROM 620 stores programs executed by the CPU 610 and fixed data. The ROM 620 is, for example, a programmable ROM (P-ROM) or a flash ROM.

The RAM 630 temporarily stores programs and data executed by the CPU 610. The RAM 630 is, for example, a dynamic-RAM (D-RAM).

The storage device 640 stores data and programs to be stored for a long period of time by the information processing device 1. The storage device 640 operates as the training data storage unit 40. The storage device 640 operates as the model storage unit 60. The storage device 640 may operate as a temporary storage device of the CPU 610. The storage device 640 is, for example, a hard disk device, a magneto-optical disk device, a solid state drive (SSD), or a disk array device.

The ROM 620 and the storage device 640 are non-transitory recording media. On the other hand, the RAM 630 is a transitory recording medium. The CPU 610 can operate based on a program recorded in the ROM 620, the storage device 640, or the RAM 630. That is, the CPU 610 can operate using a non-transitory recording medium or a transitory recording medium.

The NIC 650 relays exchange of data with an external device (not illustrated) via a network. For example, the NIC 650 acquires inference target data. Alternatively, the NIC 650 outputs the inference result. The NIC 650 is, for example, a local area network (LAN) card. Furthermore, the NIC 650 is not limited to use wired communication, but may use wireless communication.

The information processing device 1 configured as described above can obtain effects similar to those of the information processing device 1 in FIG. 1.

The reason is that the CPU 610 of the information processing device 1 can achieve a function similar to that of the information processing device 1 of FIG. 1 based on the program. Alternatively, this is because the CPU 610 and the ALU 611 of the information processing device 1 can implement functions similar to those of the information processing device 1 of FIG. 1 based on a program.

[System]

Next, an information processing system 400 including the information processing device 1 will be described with reference to the drawings.

Figure 10:
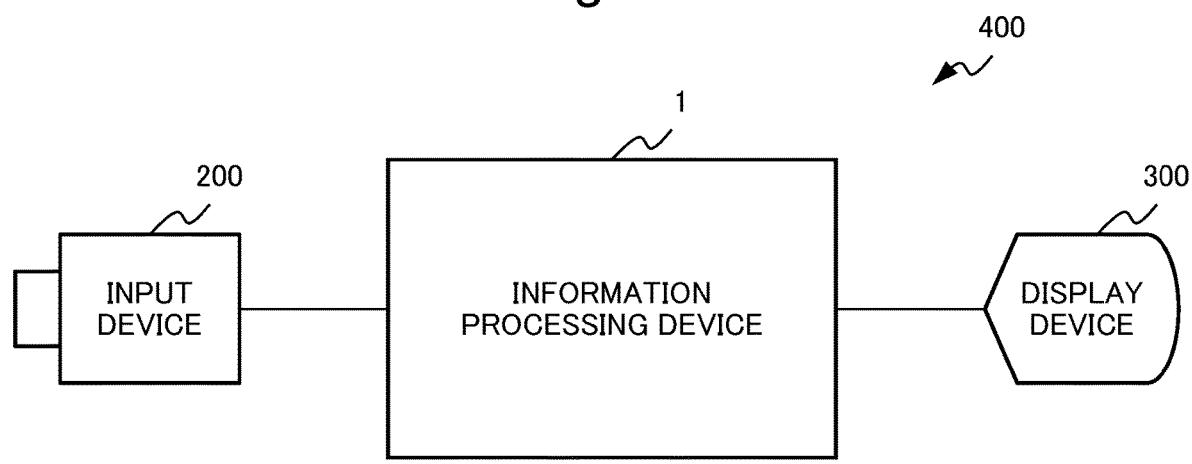
FIG. 10 is a block diagram illustrating an example of a configuration of an information processing system including an information processing device.

FIG. 10 is a block diagram illustrating an example of a configuration of an information processing system 400 including the information processing device 1.

The information processing system 400 includes the information processing device 1, an input device 200, and a display device 300. The information processing system 400 may include a plurality of devices as each device. For example, the information processing system 400 may include a plurality of input devices 200.

The input device 200 outputs the inference target data to the information processing device 1. The input device 200 may output original data for generating training data to the information processing device 1.

The input device 200 is, for example, a monitoring camera. In this case, the input device 200 outputs the captured image as the inference target data to the information processing device 1.

The information processing device 1 infers a detection target object in the inference target data acquired from the input device 200 to output an inference result (for example, BB, class, and confidence) to the display device 300.

The display device 300 displays information (for example, a result of inference of the detection target object) received from the information processing device 1.

The display device 300 is, for example, a liquid crystal display of a monitoring system. In this case, the display device 300 displays the inference result of the detection target object received from the information processing device 1.

The operator can confirm the detection target object by referring to the display on the display device 300.

Second Example Embodiment

In general, the proportion of the area occupied by the detection target object in the inference target image is often considerably small. However, the information processing device 1 may receive an inference target image in which the proportion of the detection target object is large.

In such a case, a processing time required for inference in the operation of inferring each inference target image is shorter than that in the inference operation described in the first example embodiment.

Therefore, an information processing device 1B according to the second example embodiment determines a load of primary inference using aggregate data and secondary inference using packed data (hereinafter, referred to as "two-stage inference") and a load of inference not aggregating inference target data (hereinafter, referred to as "one-stage inference"). Specifically, the information processing device 1B determines each load using information related to the load of inference using the inference target data. Then, the information processing device 1B determines which of the two-stage inference and the one-stage inference is used based on the determination result. Then, the information processing device 1B infers the detection target object in the inference target data using the determined inference.

The one-stage inference is any inference. The operator may select the appropriate inference as the one-stage inference in consideration of the detection target object and the inference target data. For example, the one-stage inference may be a general object detection task. The inference used for the one-stage inference may be the inference same as the inference used for either the primary inference or the secondary inference. That is, the inference used for the one-stage inference may be the same as the inference used for the two-stage inference.

Hereinafter, the second example embodiment will be described with reference to the drawings. In the drawings referred to in the description of the second example embodiment, the same configurations and operations as those of the first example embodiment are denoted by the same reference numerals, and the detailed description thereof may be omitted.

[Description of Configuration]

First, a configuration of an information processing device 1B according to a second example embodiment will be described with reference to the drawings. The information processing device 1B may be configured using a computer device as illustrated in FIG. 9, as in the first example embodiment. The information processing system 400 may include the information processing device 1B instead of the information processing device 1.

Figure 11:
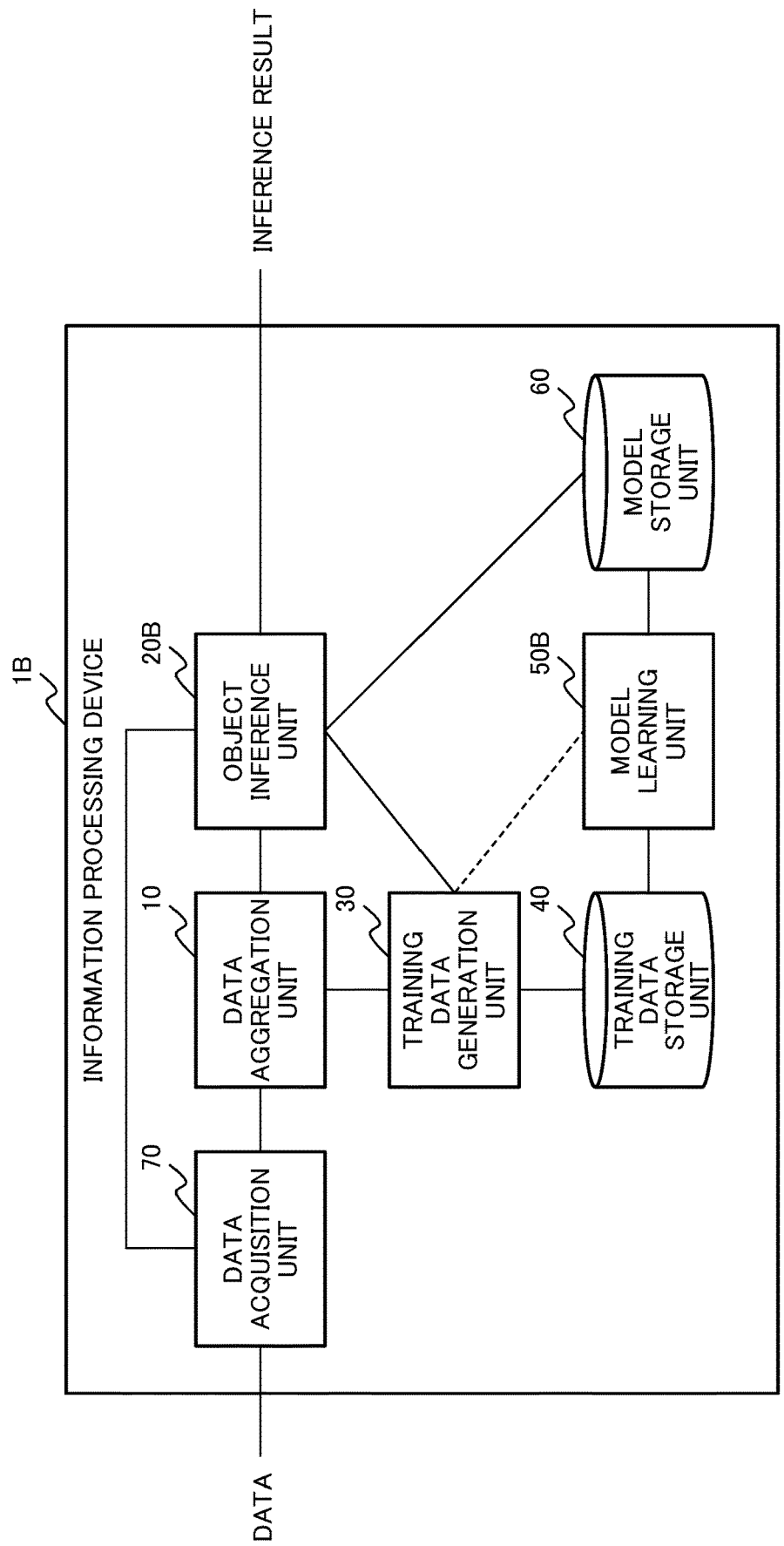
FIG. 11 is a block diagram illustrating an example of a configuration of an information processing device according to a second example embodiment.

FIG. 11 is a block diagram illustrating an example of a configuration of the information processing device 1B according to the second example embodiment.

The information processing device 1B includes a data aggregation unit 10, an object inference unit 20B, a training data generation unit 30, a training data storage unit 40, a model learning unit 50B, a model storage unit 60, and a data acquisition unit 70.

The information processing device 1B includes components similar to those of the information processing device 1 of the first example embodiment except for the object inference unit 20B and the model learning unit 50B. Therefore, the description of the configuration same as that of the first example embodiment will be omitted, and a configuration specific to the second example embodiment will be described.

The model learning unit 50B generates a trained model used in two-stage inference (primary inference and secondary inference), as in the model learning unit 50 of the first example embodiment.

Furthermore, the model learning unit 50B generates a trained model used for the one-stage inference.

A method of generating the trained model used for the one-stage inference is any method. For example, the model learning unit 50B may generate the trained model used for the one-stage inference, as in the generation of the trained model used for the two-stage inference.

For example, the training data storage unit 40 stores the learning training data of the model used for the one-stage inference in advance. Furthermore, the model storage unit 60 stores a pre-trained model for the one-stage inference. Then, the model learning unit 50B applies the stored training data to the pre-trained model to generate a trained model for the one-stage inference. Then, the model learning unit 50B stores the generated trained model for the one-stage inference in the model storage unit 60.

The information processing device 1B may use a trained model used for the two-stage inference as a trained model used for the one-stage inference. In this case, the information processing device 1B may include the model learning unit 50 instead of the model learning unit 50B.

Alternatively, the information processing device 1B may acquire a trained model used for the one-stage inference from a device (not illustrated). In this case, the information processing device 1B may include the model learning unit 50 instead of the model learning unit 50B.

First, in the first inference, the object inference unit 20B acquires the aggregate data generated by the data aggregation unit 10, performs the two-stage inference (primary inference and secondary inference), and generates a result of inference for the inference target data, as in the object inference unit 20 of the first example embodiment.

Then, the object inference unit 20B stores information related to the load of inference. The object inference unit 20B also stores information related to the load of inference as a history in the subsequent inference.

The information related to the load of inference stored as a history by the object inference unit 20B is any information.

An example of information related to the load of inference will be described.

For example, in a case where the region of the detection target object included in the inference target data is small, the number of pieces of packed data is reduced in the two-stage inference. As a result, the number of times of execution of secondary inference is reduced. That is, in this case, the time of inference using the two-stage inference is shorter than that using the one-stage inference.

On the other hand, in a case where the region of the detection target object included in the inference target data is large, the number of pieces of packed data is large. As a result, the number of times of execution of the secondary inference increases. In a case where the number of times of execution of the secondary inference is considerably large, the time of inference using the one-stage inference is shorter than that using the two-stage inference.

In this manner, the number of pieces of data used for inference is the number of times of execution of inference (inference using the trained model). Then, the load of inference (inference time) is generally proportional to the number of times of execution of inference.

Then, the number of times of execution of inference in the two-stage inference is "the number of pieces of aggregate data+the number of pieces of packed data". On the other hand, the number of times of execution of inference in the one-stage inference is "the number of pieces of inference target data".

Therefore, the object inference unit 20B may store the number of pieces of inference target data acquired by the data acquisition unit 70, the number of pieces of aggregate data generated in the data aggregation unit 10, and the number of pieces of generated packed data as information related to the load of inference.

Then, in the second and subsequent inferences, the object inference unit 20B determines which of the two-stage inference and the one-stage inference is used using a history of information related to a load of inference.

The selection of inference in the object inference unit 20B will be described in more detail.

The object inference unit 20B determines the possibility of whether the inference time of the one-stage inference is shorter than the inference time of the two-stage inference in the next inference based on the information related to the load of inference stored as a history.

In a case where the inference time of the one-stage inference is likely to be shorter than the inference time of the two-stage inference, the object inference unit 20B uses the one-stage inference. On the other hand, in a case where the inference time of the one-stage inference is less likely to be shorter than the inference time of the two-stage inference, the object inference unit 20B uses the two-stage inference. Based on such an operation, the object inference unit 20B further shortens the inference time as compared with a case where the two-stage inference is always used.

For example, the object inference unit 20 compares "the number of pieces of inference target data" with "the number of pieces of aggregate data+the number of pieces of packed data", and determines which inference to use. More specifically, for example, in a case where "the number of pieces of inference target data" is larger than "the number of pieces of aggregate data+the number of pieces of packed data", the object inference unit 20 selects the two-stage inference.

However, the history information used by the object inference unit 20B as the load determination is any information. For example, the object inference unit 20 may use a predetermined number of pieces of information from information related to the latest load in the history. In this case, the object inference unit 20 may use an average value or a moving average value of the loads included in the selected information as the value used for determination of the load. For example, the object inference unit 20 may use an average value of the number of pieces of packed data included in a predetermined number of pieces of information from the latest as the number of pieces of packed data.

Furthermore, the object inference unit 20B may use a predetermined offset value (alternatively, the bias value) in the comparison of the loads. Alternatively, the object inference unit 20B may use a value calculated using predetermined hysteresis as a value to be compared.

The object inference unit 20B may use information (for example, the resolution of the image or the imaging condition) related to data included in the inference target data used for aggregation by the data aggregation unit 10 in inference selection.

Alternatively, the object inference unit 20B may measure and store the processing time of each inference, and select the inference using a value calculated using predetermined processing (for example, an average of past processing times) on the stored processing time.

Then, the object inference unit 20B infers the detection target object using the determined inference.

In a case where the two-stage inference is selected, the object inference unit 20B performs the two-stage inference as in the object inference unit 20.

In a case where the one-stage inference is selected, the object inference unit 20B acquires the inference target data from the data acquisition unit 70 and performs the one-stage inference.

The object inference unit 20B may select the inference before the data aggregation unit 10 aggregates data. Then, in a case where the one-stage inference is selected, the information processing device 1B may omit the operation of the data aggregation unit 10. With this operation, in a case where the one-stage inference is selected, the information processing device 1B can reduce the time for generating the aggregate data not used for the inference.

In a case where the one-stage inference is selected, the information processing device 1B does not perform the two-stage inference. That is, when the one-stage inference is selected, the information processing device 1B does not update the histories (information for determining the load) of "the number of pieces of aggregate data" and "the number of pieces of packed data". Therefore, even when the load of the two-stage inference is lower than that of the one-stage inference due to a change in the ratio or the like of the objects to be detected included in the inference target data, there is a possibility that the one-stage inference is selected.

Therefore, in a case where the update of the information related to the load stops (for example, in a case where the one-stage inference is continuously selected), the information processing device 1B may operate to update the history of the information related to the load by performing the two-stage inference after performing the one-stage inference a predetermined number of times.

[Description of Operation]

Next, an operation of the information processing device 1B according to the second example embodiment will be described.

(A) Operation of Generating Trained Model

As in the information processing device 1 according to the first example embodiment, the information processing device 1B according to the second example embodiment generates a trained model used for primary inference and a trained model used for secondary inference, and stores the models in the model storage unit 60.

Furthermore, the information processing device 1B according to the second example embodiment generates a trained model used for the one-stage inference. Then, the information processing device 1B stores the generated trained model in the model storage unit 60.

(B) Inference Operation

Next, an operation in which the information processing device 1B performs inference using the inference target data acquired by the data acquisition unit 70 will be described with reference to the drawing.

Figure 12:
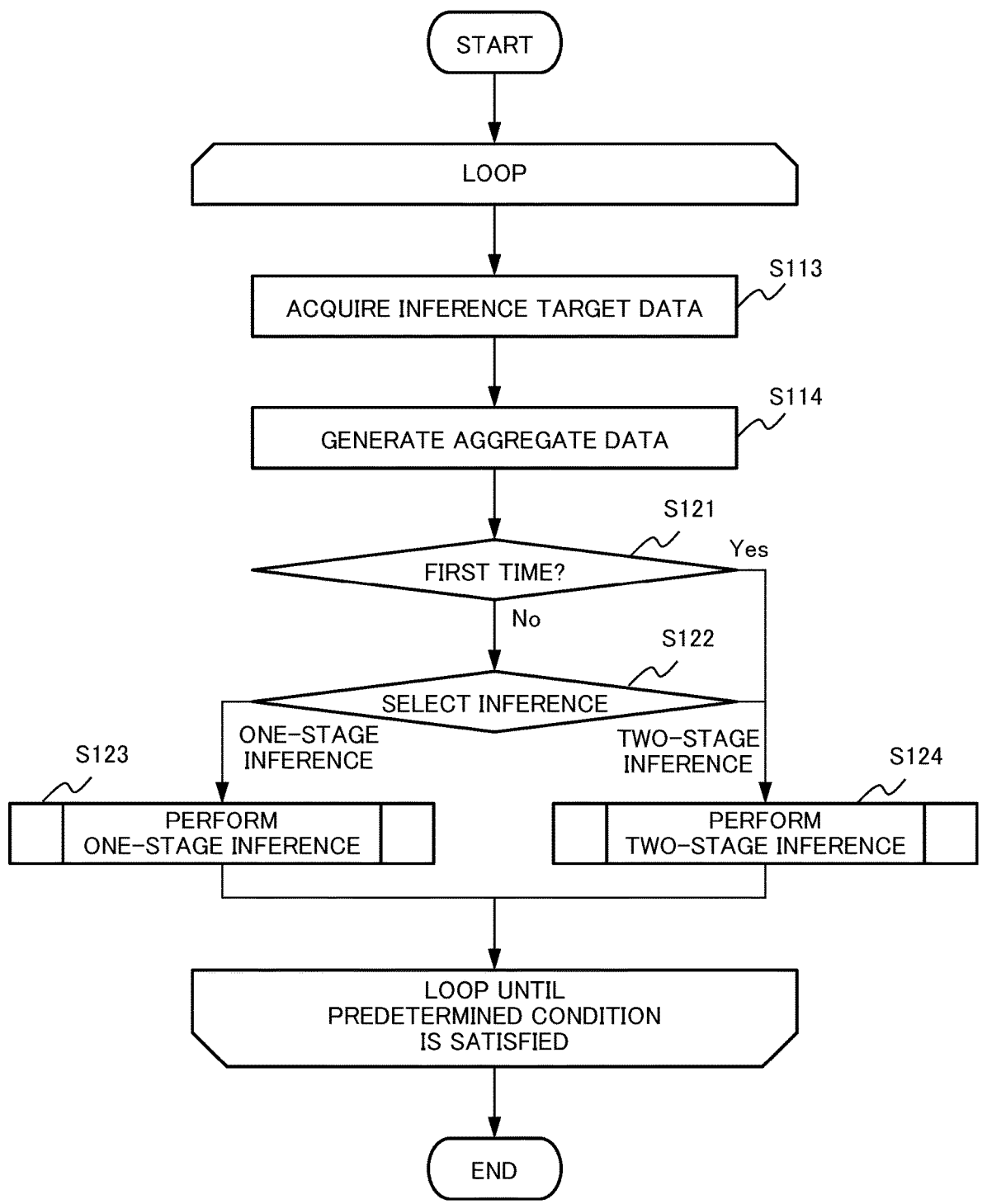
FIG. 12 is a flowchart illustrating an example of an inference operation in the information processing device according to the second example embodiment.

FIG. 12 is a flowchart illustrating an example of inference operation in the information processing device 1B according to the first example embodiment.

The model storage unit 60 stores the trained model.

In a case where the model storage unit 60 does not store the trained model, the information processing device 1B may start the inference operation after performing the above-described "(A) operation of generating trained model" to generate the trained model.

The information processing device 1B starts an inference operation in response to a predetermined condition.

For example, the information processing device 1B starts an inference operation in response to an instruction from an operator of the information processing device 1B. Alternatively, the information processing device 1B may automatically start the inference operation after the device is activated.

The information processing device 1B may receive a parameter (for example, in a case where the model storage unit 60 stores a plurality of trained models, designation of a trained model to be used) related to the operation from the operator at the start of the operation. Alternatively, the information processing device 1B may use a parameter given in advance.

The object inference unit 20B may use different trained models in the primary inference, the secondary inference, and the one-stage inference. Alternatively, the object inference unit 20B may use the same trained model in all inferences.

The information processing device 1B repeats the operation of FIG. 12 until the predetermined condition instructed by the operator is satisfied. The predetermined condition is the same as that of the first example embodiment.

The data acquisition unit 70 acquires inference target data (step S113). For example, the data acquisition unit 70 acquires a predetermined number of images.

The data aggregation unit 10 generates aggregate data based on the inference target data (step S114). The data aggregation unit 10 may generate one piece of aggregate data or may generate a plurality of pieces of aggregate data.

The object inference unit 20B determines whether it is the first inference (step S121).

In the case of the first inference (Yes in step S121), the object inference unit 20B proceeds to the two-stage inference (step S124).

When it is not the first inference (No in step S121), the object inference unit 20B selects the inference based on the history of the load of inference (step S122). More specifically, the object inference unit 20B selects the inference based on the load of the two-stage inference and the load of the one-stage inference.

In a case where the one-stage inference is selected (one-stage inference in step S122), the object inference unit 20B performs the one-stage inference (step S123).

For example, the information processing device 1B may perform a predetermined one-stage inference (for example, a general object detection task) operation as the operation of step S123.

In a case where the two-stage inference is selected (Yes in step S121 or two-stage inference in step S122), the object inference unit 20B performs the two-stage inference (step S124). Then, the object inference unit 20B stores information related to the load of inference as a history.

As the two-stage inference in step S124, the object inference unit 20B may perform an operation similar to that of steps S115 to S118 in FIG. 8 except that information related to the load of inference is stored.

By repeating the above operation, the information processing device 1B infers a detection target object in the inference target data acquired by the data acquisition unit 70.

The information processing device 1B may repeatedly perform the operation at a predetermined cycle instead of the loop operation repeated until the predetermined condition as described above is satisfied.

The information processing device 1B may perform the operation of step S114 before step S124. In other words, the information processing device 1B may generate the aggregate data in a case where the two-stage inference is performed.

[Description of Effects]

Next, effects of the second example embodiment will be described.

In addition to the effect of the first example embodiment, the second example embodiment can obtain the effect of further shortening the inference time.

The reason is as follows.

The object inference unit 20B selects either the two-stage inference or the one-stage inference based on a load of the two-stage inference using primary inference and secondary inference and a load of the one-stage inference that is inference that does not aggregate inference target data. Then, the object inference unit 20B infers the detection target object in the inference target data using the selected inference.

This is because the object inference unit 20B selects the inference to be used based on the inference load in this manner.

As a result, the object inference unit 20B can further shorten the inference time.

Furthermore, the information processing device 1B includes the model learning unit 50B. The model learning unit 50B generates a trained model used for the one-stage inference using predetermined data and a predetermined model.

Therefore, the information processing device 1B can use an appropriately trained model for the one-stage inference.

Third Example Embodiment

The information processing devices 1 and 1B may acquire the trained model from another device. Furthermore, the information processing devices 1 and 1B may use a trained model stored in an external device as a trained model used for inference.

Figure 13:
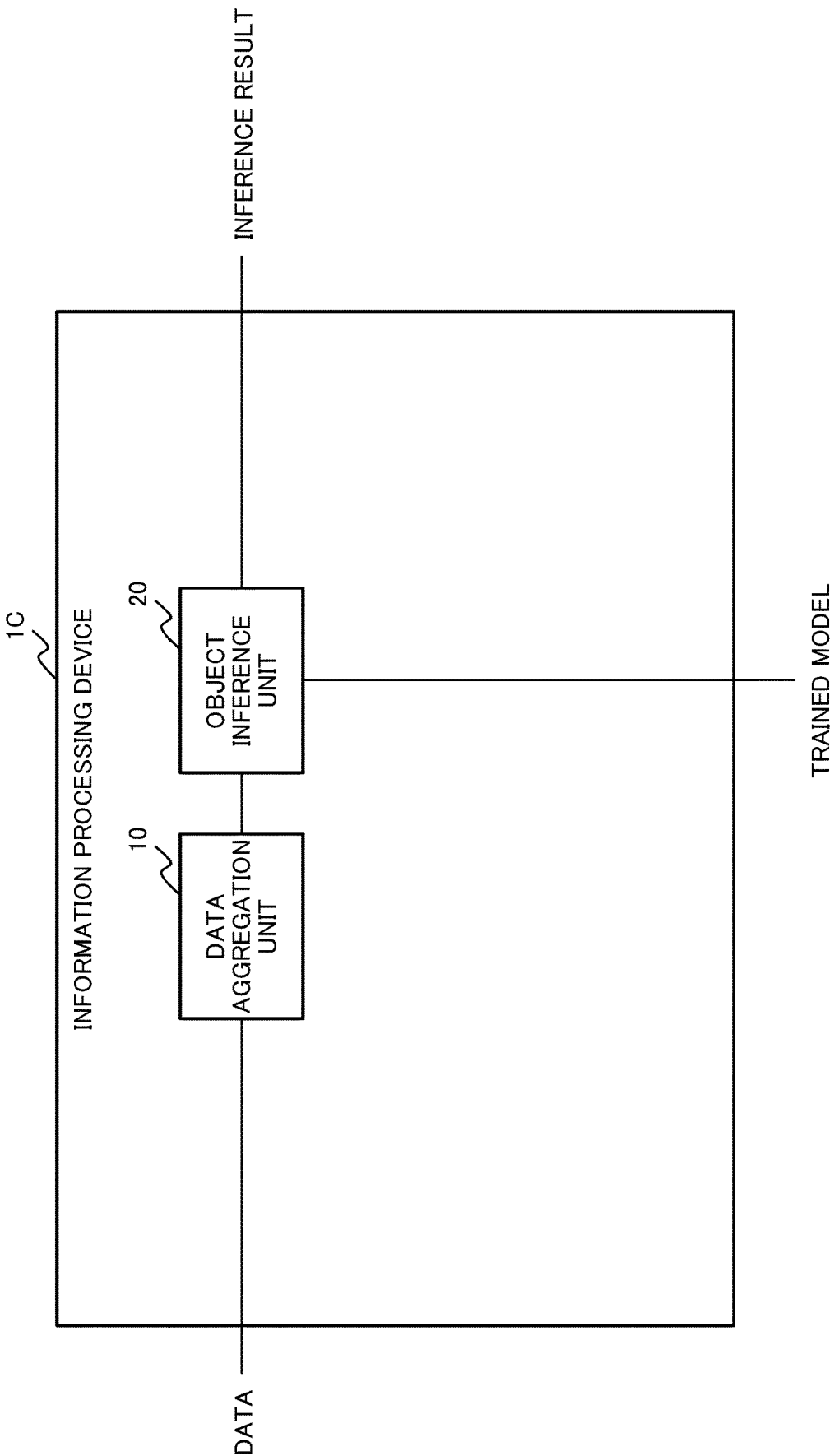
FIG. 13 is a block diagram illustrating an example of a configuration of an information processing device according to a third example embodiment.

FIG. 13 is a block diagram illustrating an example of a configuration of an information processing device 1C according to the third example embodiment.

The information processing device 1C includes a data aggregation unit 10 and an object inference unit 20. The data aggregation unit 10 generates aggregate data the number of pieces of which is smaller than the number of pieces of data included in the inference target data based on the inference target data that is a plurality of pieces of data at least some of which include the detection target object. As the primary inference, the object inference unit 20 applies the aggregate data to the trained model to infer a first region that is a region of the detection target object in the aggregate data. Then, the object inference unit 20 generates packed data that is data packed with a duplicate of the first region or a duplicate of the region of the inference target data related to the first region. Then, the object inference unit 20 applies the packed data to the trained model as the secondary inference to infer the second region that is the region of the detection target object included in the packed data. Then, the object inference unit 20 infers a detection target object in the inference target data based on the second region.

Each configuration of the information processing device 1C operates as in each related configuration in the information processing device 1.

The information processing device 1C configured as described above can obtain effects similar to those of the information processing device 1. That is, the information processing device 1C can achieve an effect of shortening the inference time of the detection target object.

This is because each component of the information processing device 1C operates as in each related component in the information processing device 1.

The information processing device 1C has the minimum configuration of the information processing device 1.

Some or all of the above example embodiments may be described as the following Supplementary Notes, but are not limited to the following.

(Supplementary Note 1)

An information processing device including:
  a memory; and
  at least one processor coupled to the memory,
  the processor performing operations, the operations including:
  generating, based on inference target data that is a plurality of pieces of data at least some of which include a detection target object, aggregate data the number of pieces of which is smaller than the number of pieces of data included in the inference target data; and
  applying the aggregate data to a trained model to infer, as a primary inference, a first region that is a region of the detection target object in the aggregate data, generating packed data that is data packed with a duplicate of the first region or a duplicate of a region of the inference target data related to the first region, applying the packed data to a trained model to infer, as a secondary inference, a second region that is a region of the detection target object that is included in the packed data, and inferring the detection target object in the inference target data based on the second region.

(Supplementary Note 2)

The information processing device according to Supplementary Note 1, wherein the operations further including:

applying training data to a predetermined model to generate a trained model.

(Supplementary Note 3)

The information processing device according to Supplementary Note 2, wherein the operations further including:
generating learning aggregate data, and generating learning packed data; and
generating a trained model to which the aggregate data is applied using the generated learning aggregate data, and generating a trained model to which the packed data is applied using the generated learning packed data.

(Supplementary Note 4)

The information processing device according to any one of Supplementary Notes 1 to 3, wherein the operations further including:
selecting, based on a load of two-stage inference using the primary inference and the secondary inference and a load of one-stage inference that is inference that does not aggregate the inference target data, either the two-stage inference or the one-stage inference, and inferring the detection target object in the inference target data using the selected inference.

(Supplementary Note 5)

The information processing device according to Supplementary Note 2 or 3, wherein the operations further including:
selecting, based on a load of two-stage inference using the primary inference and the secondary inference and a load of one-stage inference that is inference that does not aggregate the inference target data, either the two-stage inference or the one-stage inference, and inferring the detection target object in the inference target data using the selected inference; and
generating a trained model used for the one-stage inference using a predetermined model and predetermined data.

(Supplementary Note 6)

The information processing device according to any one of Supplementary Notes 1 to 5, wherein
data including the detection target object is an image, and
the operations further including:
generating an image using, as the aggregate data, an average value of values of respective pixels from a plurality of images.

(Supplementary Note 7)

An information processing system including:
the information processing device according to any one of Supplementary Notes 1 to 6;
an input device that outputs the inference target data to the information processing device; and
a display device that acquires and displays a result of inference by the information processing device.

(Supplementary Note 8)

An information processing method including:
generating, based on inference target data that is a plurality of pieces of data at least some of which include a detection target object, aggregate data the number of pieces of which is smaller than the number of pieces of data included in the inference target data; and
applying the aggregate data to a trained model to infer, as a primary inference, a first region that is a region of the detection target object in the aggregate data, generating packed data that is data packed with a duplicate of the first region or a duplicate of a region of the inference target data related to the first region, applying the packed data to a trained model to infer, as a secondary inference, a second region that is a region of the detection target object that is included in the packed data, and inferring the detection target object in the inference target data based on the second region.

(Supplementary Note 9)

The information processing method according to Supplementary Note 8, further including:
applying training data to a predetermined model to generate a trained model.

(Supplementary Note 10)

The information processing method according to Supplementary Note 9, further including:
generating learning aggregate data using predetermined data, and generating learning packed data using the generated learning aggregate data; and
generating a trained model to which the aggregate data is applied using the generated learning aggregate data, and generating a trained model to which the packed data is applied using the generated learning packed data.

(Supplementary Note 11)

The information processing method according to any one of Supplementary Notes 8 to 10, further including:
selecting, based on a load of two-stage inference using the primary inference and the secondary inference and a load of one-stage inference that is inference that does not aggregate the inference target data, either the two-stage inference or the one-stage inference, and inferring the detection target object in the inference target data using the selected inference.

(Supplementary Note 12)

The information processing method according to Supplementary Note 9 or 10, further including:
selecting, based on a load of two-stage inference using the primary inference and the secondary inference and a load of one-stage inference that is inference that does not aggregate the inference target data, either the two-stage inference or the one-stage inference, and inferring the detection target object in the inference target data using the selected inference; and
generating a trained model used for the one-stage inference using a predetermined model and predetermined data.

(Supplementary Note 13)

The information processing method according to any one of Supplementary Notes 8 to 12, wherein
data including the detection target object is an image, and
the method includes generating an image using, as the aggregate data, an average value of values of respective pixels from a plurality of images.

(Supplementary Note 14)

An information processing method further including:
performing, by an information processing device, the information processing method according to any one of Supplementary Notes 8 to 13;
outputting, by an input device, the inference target data to the information processing device; and
acquiring and displaying, by a display device, a result of inference by the information processing device.

(Supplementary Note 15)

A non-transitory computer-readable recording medium that embodies a program for causing a computer to perform a method, the method including:
generating, based on inference target data that is a plurality of pieces of data at least some of which include a detection target object, aggregate data the number of pieces of which is smaller than the number of pieces of data included in the inference target data; and applying the aggregate data to a trained model to infer, as a primary inference, a first region that is a region of the detection target object in the aggregate data, generating packed data that is data packed with a duplicate of the first region or a duplicate of a region of the inference target data related to the first region, applying the packed data to a trained model to infer, as a secondary inference, a second region that is a region of the detection target object that is included in the packed data, and inferring the detection target object in the inference target data based on the second region.

(Supplementary Note 16)

The recording medium according to Supplementary Note 15 that embodies a program for causing a computer to perform a method, the method including:

applying training data to predetermined model to generate trained model.

(Supplementary Note 17)

The recording medium according to Supplementary Note 16 that embodies a program for causing a computer to perform a method, the method including:

generating learning aggregate data using predetermined data and generating learning packed data using the generated learning aggregate data; and generating a trained model to which the aggregate data is applied using the generated learning aggregate data and generating a trained model to which the packed data is applied using the generated learning packed data.

(Supplementary Note 18)

The recording medium according to any one of Supplementary Notes 15 to 17 that embodies a program for causing a computer to perform a method, the method including:

selecting, based on a load of two-stage inference using the primary inference and the secondary inference and a load of one-stage inference that is inference that does not aggregate the inference target data, either the two-stage inference or the one-stage inference, and inferring the detection target object in the inference target data using the selected inference.

(Supplementary Note 19)

The recording medium according to Supplementary Note 16 or 17 that embodies a program for causing a computer to perform a method, the method including;

selecting, based on a load of two-stage inference using the primary inference and the secondary inference and a load of one-stage inference that is inference that does not aggregate the inference target data, either the two-stage inference or the one-stage inference, and inferring the detection target object in the inference target data using the selected inference; and generating a trained model used for the one-stage inference using a predetermined model and predetermined data.

(Supplementary Note 20)

The recording medium according to any one of Supplementary Notes 15 to 19, wherein data including the detection target object is an image, and the recording medium embodies a program for causing a computer to perform a method, the method including:

generating an image using, as the aggregate data, an average value of values of respective pixels from a plurality of images.

Although the present invention is described above with reference to the example embodiments, the present invention is not limited to the above example embodiments.

Various changes that can be understood by those of ordinary skill can be made in the configuration and details of the present invention within the scope of the present invention.

REFERENCE SIGNS LIST 1 information processing device
1B information processing device
1C information processing device
10 data aggregation unit
20 object inference unit
20B object inference unit
30 training data generation unit
40 training data storage unit
50 model learning unit
50B model learning unit
60 model storage unit
70 data acquisition unit
200 input device
300 display device
400 information processing system
610 CPU
611 ALU
620 ROM
630 RAM
640 storage device
650 NIC
690 recording medium

What is claimed is:

1. An information processing device comprising:

a memory; and at least one processor coupled to the memory, the processor performing operations, the operations comprising:

generating, based on inference target data that is a plurality of pieces of data at least some of which include a detection target object, aggregate data, the number of pieces of which is smaller than the number of pieces of data included in the inference target data; and applying the aggregate data to a first trained model to infer, as a primary inference, a first region that is a region of the detection target object in the aggregate data, generating packed data that is data packed with a duplicate of the first region or a duplicate of a region of the inference target data related to the first region, applying the packed data to a second trained model to infer, as a secondary inference, a second region that is a region of the detection target object that is included in the packed data, and inferring the detection target object in the inference target data based on the second region.

2. The information processing device according to claim 1, wherein the operations further comprise:

applying training data to a first predetermined model to generate the first trained model and/or applying the training data to a second predetermined model to generate the second trained model.

3. The information processing device according to claim 2, wherein the operations further comprise:

generating learning aggregate data using predetermined data, and generating learning packed data using the generated learning aggregate data; and generating the first trained model to which the aggregate data is applied using the generated learning aggregate data, and generating the second trained model to which the packed data is applied using the generated learning packed data.

4. The information processing device according to claim 1 wherein the operations further comprise:
  selecting, based on a load of two-stage inference using the primary inference and the secondary inference and a load of one-stage inference that is inference that does not aggregate the inference target data, either the two-stage inference or the one-stage inference, and inferring the detection target object in the inference target data using the selected inference.

5. The information processing device according to claim 2, wherein the operations further comprise:
  selecting, based on a load of two-stage inference using the primary inference and the secondary inference and a load of one-stage inference that is inference that does not aggregate the inference target data, either the two-stage inference or the one-stage inference, and inferring the detection target object in the inference target data using the selected inference, and
  generating a trained model used for the one-stage inference using a third predetermined model and predetermined data.

6. The information processing device according to claim 1 wherein
  data including the detection target object is an image, and the operations further comprise:
  generating an image using, as the aggregate data, an average value of values of respective pixels from a plurality of images.

7. An information processing method comprising:
  generating, based on inference target data that is a plurality of pieces of data at least some of which include a detection target object, aggregate data, the number of pieces of which is smaller than the number of pieces of data included in the inference target data; and
  applying the aggregate data to a first trained model to infer, as a primary inference, a first region that is a region of the detection target object in the aggregate data, generating packed data that is data packed with a duplicate of the first region or a duplicate of a region of the inference target data related to the first region, applying the packed data to a second trained model to infer, as a secondary inference, a second region that is a region of the detection target object that is included in the packed data, and inferring the detection target object in the inference target data based on the second region.

8. The information processing method according to claim 7, further comprising:
  applying training data to a first predetermined model to generate the first trained model and/or applying the training data to a second predetermined model to generate the second trained model.

9. The information processing method according to claim 8, further comprising:
  generating learning aggregate data using predetermined data, and generating learning packed data using the generated learning aggregate data; and
  generating the first trained model to which the aggregate data is applied using the generated learning aggregate data, and generating the second trained model to which the packed data is applied using the generated learning packed data.

10. The information processing method according to claim 7, further comprising:
  selecting, based on a load of two-stage inference using the primary inference and the secondary inference and a load of one-stage inference that is inference that does not aggregate the inference target data, either the two-stage inference or the one-stage inference, and inferring the detection target object in the inference target data using the selected inference.

11. The information processing method according to claim 8, further comprising:
  selecting, based on a load of two-stage inference using the primary inference and the secondary inference and a load of one-stage inference that is inference that does not aggregate the inference target data, either the two-stage inference or the one-stage inference, and inferring the detection target object in the inference target data using the selected inference; and
  generating a trained model used for the one-stage inference using a third predetermined model and predetermined data.

12. The information processing method according to claim 7, wherein
  data including the detection target object is an image, and the method comprises: generating an image using, as the aggregate data, an average value of values of respective pixels from a plurality of images.

13. A non-transitory computer-readable recording medium that embodies a program for causing a computer to perform a method, the method comprising:
  generating, based on inference target data that is a plurality of pieces of data at least some of which include a detection target object, aggregate data, the number of pieces of which is smaller than the number of pieces of data included in the inference target data; and
  applying the aggregate data to a first trained model to infer, as a primary inference, a first region that is a region of the detection target object in the aggregate data, generating packed data that is data packed with a duplicate of the first region or a duplicate of a region of the inference target data related to the first region, applying the packed data to a second trained model to infer, as a secondary inference, a second region that is a region of the detection target object that is included in the packed data, and inferring the detection target object in the inference target data based on the second region.

14. The recording medium according to claim 13 that embodies a program for causing a computer to perform a method, the method comprising:
  applying training data to a first predetermined model to generate the first trained model and/or applying the training data to a second predetermined model to generate the second trained model.

15. The recording medium according to claim 14 that embodies a program for causing a computer to perform a method, the method comprising:
  generating learning aggregate data using predetermined data and generating learning packed data using the generated learning aggregate data; and
  generating the first trained model to which the aggregate data is applied using the generated learning aggregate data, and generating the second trained model to which the packed data is applied using the generated learning packed data.

16. The recording medium according to claim 13 that embodies a program for causing a computer to perform a method, the method comprising:
  selecting, based on a load of two-stage inference using the primary inference and the secondary inference and a load of one-stage inference that is inference that does not aggregate the inference target data, either the two-stage inference or the one-stage inference, and inferring the detection target object in the inference target data using the selected inference.

17. The recording medium according to claim 14 that embodies a program for causing a computer to perform a method, the method comprising:
selecting, based on a load of two-stage inference using the primary inference and the secondary inference and a load of one-stage inference that is inference that does not aggregate the inference target data, either the two-stage inference or the one-stage inference, and inferring the detection target object in the inference target data using the selected inference; and
generating a trained model used for the one-stage inference using a third predetermined model and predetermined data.

18. The recording medium according to claim 13, wherein data including the detection target object is an image, and
the recording medium embodies a program for causing a computer to perform a method, the method comprising:
generating an image using, as the aggregate data, an average value of values of respective pixels from a plurality of images.

* * * * *